(12) United States Patent
Tamura et al.

(10) Patent No.: US 8,731,787 B2
(45) Date of Patent: May 20, 2014

(54) TRANSPORTER VEHICLE

(75) Inventors: Katsumi Tamura, Omitama (JP);
Toshikazu Minoshima, Kasumigaura (JP); Michio Fushiki, Tsuchiura (JP); Takao Kurosawa, Ushiku (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 1 day.

(21) Appl. No.: 13/510,977

(22) PCT Filed: Mar. 29, 2011

(86) PCT No.: PCT/JP2011/057803
§ 371 (c)(1),
(2), (4) Date: May 21, 2012

(87) PCT Pub. No.: WO2011/135959
PCT Pub. Date: Nov. 3, 2011

(65) Prior Publication Data
US 2013/0035828 A1 Feb. 7, 2013

(30) Foreign Application Priority Data

Apr. 26, 2010 (JP) .................................. 2010-100503

(51) Int. Cl.
*B60P 1/16* (2006.01)
*B60P 1/28* (2006.01)
*B60K 28/14* (2006.01)
*F04F 7/02* (2006.01)

(52) U.S. Cl.
USPC ................. 701/50; 91/436; 137/47; 180/53.4

(58) Field of Classification Search
USPC ................. 701/50; 91/436; 137/47; 180/53.4
See application file for complete search history.

(56) References Cited

U.S. PATENT DOCUMENTS

| | | | | |
|---|---|---|---|---|
| 4,511,974 A | * | 4/1985 | Nakane et al. | 701/124 |
| 4,518,044 A | * | 5/1985 | Wiegardt et al. | 172/7 |
| 4,724,372 A | * | 2/1988 | Takeuchi et al. | 318/685 |
| 5,393,936 A | * | 2/1995 | Tyhy et al. | 177/138 |
| 5,584,224 A | * | 12/1996 | Davies et al. | 91/361 |
| 5,902,090 A | * | 5/1999 | Young et al. | 414/527 |
| 6,871,575 B2 | * | 3/2005 | Korogi | 91/436 |

(Continued)

FOREIGN PATENT DOCUMENTS

| JP | 50-70383 U | 6/1975 |
|---|---|---|
| JP | 50-114008 U | 9/1975 |

(Continued)

*Primary Examiner* — Fadey Jabr
*Assistant Examiner* — Martin Weeks
(74) *Attorney, Agent, or Firm* — Mattingly & Malur, PC

(57) ABSTRACT

A control valve device comprises two direction control valves. The direction control valve includes an expansion side variable throttle portion and a contraction side variable throttle portion. The direction control valve includes an expansion side variable throttle portion and a contraction side variable throttle portion. When a hoist cylinder is telescopically operated to raise or lower a vessel, as the hoist cylinder approaches a stop position, a controller determines that the hoist cylinder gets close to the stop position. Based upon this determination, the controller variably adjusts a flow passage area of the direction control valve using the variable throttle portions or variably adjusts a flow passage area of the direction control valve using the variable throttle portions in such a manner as to slow down or speed up the telescopic speed of the hoist cylinder corresponding to the weight in the side of vessel.

7 Claims, 8 Drawing Sheets

(56) References Cited

U.S. PATENT DOCUMENTS

| | | | | |
|---|---|---|---|---|
| 7,506,505 | B2* | 3/2009 | Fushimi | 60/368 |
| 2002/0038548 | A1* | 4/2002 | Sharkness et al. | 60/469 |
| 2005/0225159 | A1* | 10/2005 | Thorvaldson | 298/19 R |
| 2010/0026079 | A1 | 2/2010 | Nabeshima et al. | |

FOREIGN PATENT DOCUMENTS

| | | |
|---|---|---|
| JP | 62-23744 U | 2/1987 |
| JP | 2001-105956 A | 4/2001 |
| JP | 2006-052810 A | 2/2006 |
| WO | 2008/099691 A1 | 8/2008 |

* cited by examiner

TRANSPORTER VEHICLE

TECHNICAL FIELD

The present invention relates to a large transporter vehicle which is suitably used in transporting, for example, crushed stones or earth and sand excavated from an open-pit stope, a stone quarry or a mine.

BACKGROUND ART

Generally, a large-sized transporter vehicle called a dump truck has a liftable vessel (loading platform) on a frame of a vehicle body, and carries and transports objects (for example, crushed stones or earth and sand) to be transported in a state where the objects to be transported are loaded in a large quantity on the vessel (for example, Patent Document 1).

A transporter vehicle of this type according to the conventional art comprises an automotive vehicle body, a loading platform which is tiltably (liftably) provided on the vehicle body and on which the objects to be transported are loaded, a hoist cylinder which is telescopically provided between the loading platform and the vehicle body and expands at the time of dumping the objects from the loading platform to tilt the loading platform diagonally backward of the vehicle body, and a controller for controlling an operation and a stop of the hoist cylinder.

This type of transporter vehicle self-travels to the transportation destination in a state of loading the objects on the loading platform and thereafter, expands the hoist cylinder to diagonally backward raise the loading platform. This raising operation allows the objects to be dumped to a cargo collection site along the tilted loading platform. After such a dumping operation is completed, the hoist cylinder is contracted by a manual operation of an operating lever or the hoist cylinder is contracted by a self-weight in the side of the loading platform. This contraction operation of the hoist cylinder causes the loading platform to be lowered to a position where the loading platform is seated on the vehicle body.

PRIOR ART DOCUMENTS

Patent Documents

Patent Document 1: Japanese Patent Laid-Open No. 2001-105956 A

SUMMARY OF THE INVENTION

Incidentally, in the transporter vehicle according to the above-described conventional art, the hoist cylinder is driven in the expansion direction to tilt the loading platform in the backward of the vehicle body, and when the loading platform is tilted to a dumping position of the object to be transported, the expansion operation of the hoist cylinder is stopped. Meanwhile, after dumping the object to be transported, the hoist cylinder is contracted, and when the loading platform is lowered to a position where the loading platform is seated on the vehicle body, the contraction operation of the hoist cylinder is stopped.

In a case of the conventional art, however, when an inclination angle of the loading platform reaches an angle in advance determined, the telescopic operation of the hoist cylinder is stopped regardless of a weight of the object to be transported. Therefore, at the time of stopping the hoist cylinder, in some cases the shock generated accompanying this stop may be increased to be large depending on the weight of the object to be transported.

Namely, at the time of stopping the telescopic operation of the hoist cylinder, a flow amount of pressurized oil between a hydraulic source and the hoist cylinder is temporarily throttled by a control valve device, and thereafter, the flow of the pressurized oil is blocked. However, since an opening area at the time the control valve device throttles the flow of the pressurized oil is maintained to be constant regardless of the weight of the object to be transported, in some cases an operation speed of the hoist cylinder until the hoist cylinder is stopped becomes excessively quick or slow depending on a magnitude of the weight of the object to be transported.

Therefore, in a case where the weight of the object to be transported is light, for example, although the contraction speed of the hoist cylinder is desired to be increased, the contraction speed of the hoist cylinder is kept constant without relation to the weight thereof, which therefore, gives an operator the feeling that the speed is slow, creating a problem that the time required for reaching the original stop position becomes perceptibly longer. Meanwhile, in a case where the object to be transported is heavy, although the contraction speed of the hoist cylinder is desired to slow down, the contraction speed of the hoist cylinder is kept constant without relation to the weight thereof, which therefore, gives an operator the feeling that the speed is quick, creating a problem that the shock at the time of stopping the hoist cylinder becomes large. Also in a case of expanding the hoist cylinder, the same problem occurs.

In view of the above-described problems with the conventional art, it is an object of the present invention to provide a transporter vehicle which can adjust a telescopic speed to of a hoist cylinder corresponding to a weight of an object to be transported to appropriately alleviate a shock at hoist cylinder stopping.

(1) In order to solve the above-described problems, the present invention is applied to a transporter vehicle comprising: an automotive vehicle body; a loading platform tiltably provided on the vehicle body to load an object to be transported thereon; a hoist cylinder telescopically provided between the loading platform and the vehicle body and expanding at the time of dumping the object from the loading platform to obliquely tilt the loading platform; a hydraulic source for generating pressurized oil to be supplied to the hoist cylinder; a control valve device provided between the hydraulic source and the hoist cylinder for controlling the supply and the discharge of the pressurized oil to and from the hoist cylinder; and an operating device for performing a switching operation of the control valve device.

The feature of the arrangement adopted by the present invention lies in the arrangement comprising a tilting state detector for detecting a tilting state of the loading platform to the vehicle body; a weight detector for detecting a weight of objects loaded on the loading platform; and a controller for controlling switching of the control valve device based upon signals from the operating device, the tilting state detector and the weight detector; wherein the controller comprises: stop position approach determining means for determining whether or not the hoist cylinder approaches (gets close to) a stop position in an expansion side or in a contraction side based upon signals from the operating device and the tilting state detector; and flow amount adjusting means for, when it is determined by the stop position approach determining means that the hoist cylinder approaches the stop position, controlling the switching of the control valve device in such a manner as to change a telescopic speed of the hoist cylinder corresponding to the weight in the side of the loading platform detected by the weight detector for variably adjusting a flow amount of an oil liquid flowing between the hoist cylinder and the hydraulic source through the control valve device.

With this arrangement, when it is determined that the hoist cylinder approaches the stop position at the time of raising the loading platform with the expansion of the hoist cylinder or lowering the loading platform with the contraction of the hoist cylinder, the controller controls the switching of the control valve device in such a manner as to decrease or increase the telescopic speed of the hoist cylinder corresponding to the weight in the side of the loading platform. Therefore, the controller variably adjusts the flow amount of the oil liquid flowing in the control valve device and throttles a flow passage area or an opening area of the control valve device. As a result, in a case where the object to be transported is heavy, even if the telescopic speed of the hoist cylinder is quick, the flow amount of the oil liquid can be appropriately throttled through the control valve device to suppress a motion of the hoist cylinder before reaching the stop position, thus alleviating generation of a shock.

Meanwhile, in a case where objects to be transported are heavy or no object to be transported is present, appropriate adjustment of the flow amount of the oil liquid through the control valve device prevents the expansion speed of the hoist cylinder from being excessively quick or the contraction speed of the hoist cylinder from being excessively slow, making it possible to stop the hoist cylinder to the original stop position in a state of suppressing the shock. Therefore, an operator of the transporter vehicle can raise/lower the loading platform for a short time simply by operating the operating device as usual without any influence of a size or presence/absence of loading of an object to be transported, and generation of the shock at the time of stopping the hoist cylinder can be suppressed to improve the operability and stability.

(2) In this case, according to the present invention, there may be provided an oil temperature sensor for detecting a temperature of the oil liquid flowing in the control valve device, wherein the controller corrects the adjustment flow amount of the oil liquid by the flow amount adjusting means corresponding to the temperature of the oil liquid detected by the oil temperature sensor.

With this arrangement, the controller can correct the adjustment flow amount of the oil liquid according to the temperature of the oil liquid detected by the oil temperature sensor. Namely, an influence of the viscosity resistance accompanying a temperature change of the oil liquid can be corrected. Therefore, the flow amount of the oil liquid flowing between the hoist cylinder and the hydraulic source can be appropriately adjusted, and the shock at the time of stopping the hoist cylinder can be appropriately alleviated without relation to a change in oil temperature.

(3) On the other hand, according to the present invention, the controller variably sets a determination reference value at the time of determining whether or not the hoist cylinder approaches the stop position by the stop position approach determining means, corresponding to a tilting speed of the loading platform, and may correct start timing of the flow amount adjustment by the flow amount adjusting means according to the determination reference value.

As in the case of this arrangement, in consideration of the tilting speed of the loading platform, when the tilting speed is quick, the adjustment control of the flow amount through the control valve device can be started at the earlier timing depending on whether or not the tilting angle of the loading platform reaches the corresponding determination reference value. On the other hand, when the tilting speed is slow, the determination reference value can be set such that the start timing is delayed, and the adjustment control of the flow amount through the control valve device can be started at the delayed timing depending on whether or not the tilting angle of the loading platform reaches the determination reference value.

(4) In a case of the above-mentioned paragraph (1), according to the present invention, the weight detector comprises a pressure sensor for detecting a load pressure in the hoist cylinder. By thus using the pressure sensor as the weight detector, the controller side can determine whether the loading platform is in a vacant state or in a loading state of the object, or whether the weight of the object is heavy or light, based upon the load pressure in the hoist cylinder.

(5) In a case of the above-mentioned paragraph (1), according to the present invention, the tilting state detector comprises an angle sensor for detecting a tilting angle of the loading platform to the vehicle body. As a result, the tilting angle of the loading platform to the vehicle body can be detected by using the angle sensor and the controller side can determine whether or not the hoist cylinder is close to the stop position based upon the tilting angle of the loading platform.

(6) In a case of the above-mentioned paragraph (5), according to the present invention, the stop position approach determining means may determine whether or not the hoist cylinder approaches the stop position based upon whether or not the tilting angle of the loading platform detected by the angle sensor reaches an angle of a determination reference, and the controller may variably set the angle of the determination reference corresponding to a tilting speed of the loading platform.

With this arrangement, the controller can variably set the angle of the determination reference corresponding to the tilting speed of the loading platform, and it can be determined whether or not the hoist cylinder approaches the stop position based upon whether or not the tilting angle of the loading platform detected by the angle sensor reaches the angle of the determination reference of this time.

(7) In addition, according to the present invention, the control valve device comprises: a plurality of switching positions including a neutral position of stopping the supply and the discharge of the pressurized oil to stop a motion of the hoist cylinder; a raising position of expanding the hoist cylinder by the supply and the discharge of the pressurized oil to raise the loading platform; a floating position of contracting the hoist cylinder by the self-weight in the side of the loading platform to allow a self-weight fall of the loading platform; and a lowering position of contracting the hoist cylinder by the supply and the discharge of the pressurized oil to lower the loading platform, wherein the raising position of the control valve device is provided with an expansion side variable throttle portion for performing a flow amount adjustment of the oil liquid according to a control signal by the flow amount adjusting means of the controller to variably adjust an expansion speed of the hoist cylinder, and each of the floating position and the lowering position of the control valve device is provided with a contraction side variable throttle portion for performing a flow amount adjustment of the oil liquid according to a control signal by the flow amount adjusting means of the controller to variably adjust a contraction speed of the hoist cylinder.

With this arrangement, the control valve device can variably throttle the flow amount of the pressurized oil to be supplied to the hoist cylinder from the hydraulic source by operating the expansion side variable throttle portion according to the control signal by the flow amount adjusting means of the controller in a state where the hoist cylinder is switched to the raising position of raising the loading platform with the expansion of the hoist cylinder, which can prevent the expansion speed of the hoist cylinder from being excessively quick or slow.

In a state where the hoist cylinder is switched to the floating position of allowing the self-weight fall of the loading platform by contracting the hoist cylinder with the self-weight in the side of the loading platform, an operation of the contraction side variable throttle portion according to the control signal from the flow amount adjusting means of the controller enables the flow amount of the oil liquid returned back to the side of the hydraulic source from the hoist cylinder to be variably throttled, and can adjust the contraction speed of the hoist cylinder to an appropriate speed. On the other hand, even in a state where the hoist cylinder is switched to the lowering position of allowing the downward rotation of the loading platform, an operation of the other contraction side variable throttle portion according to the control signal by the flow amount adjusting means of the controller enables the contraction speed of the hoist cylinder to be adjusted to an appropriate speed.

(8) Further, according to the present invention, the control valve device comprises: a combination of a first direction control valve which is switched to any one of a neutral position of stopping the supply and the discharge of the pressurized oil to stop a motion of the hoist cylinder, a raising position of expanding the hoist cylinder by the supply and the discharge of the pressurized oil to raise the loading platform, and a floating position of contracting the hoist cylinder by the self-weight in the side of the loading platform to allow a self-weight fall of the loading platform, according to a control signal from the controller; and a second direction control valve which is switched to any one of the neutral position, the raising position, and a lowering position of contracting the hoist cylinder by the supply and the discharge of the pressurized oil to lower the loading platform, according to a control signal from the controller; wherein the first direction control valve includes a first expansion side variable throttle portion for variably adjusting a flow amount of the oil liquid according to a control signal by the flow amount adjusting means of the controller when the first direction control valve is switched to the raising position and a first contraction side variable throttle portion for variably adjusting a flow amount of the oil liquid according to a control signal by the flow amount adjusting means of the controller when the first direction control valve is switched to the floating position; and the second direction control valve includes a second expansion side variable throttle portion for variably adjusting a flow amount of the oil liquid according to a control signal by the flow amount adjusting means of the controller when the second direction control valve is switched to the raising position and a second contraction side variable throttle portion for variably adjusting a flow amount of the oil liquid according to a control signal by the flow amount adjusting means of the controller when the second direction control valve is switched to the lowering position.

With this arrangement, the control valve device can comprise a combination of the first direction control valve and the second direction control valve, wherein either one of the expansion side or contraction side variable throttle portion is operated depending on which one of the raising position, the floating position and the lowering position the direction control valve is switched to, thus making it possible to adjust the telescopic speed of the hoist cylinder appropriately.

MODE FOR CARRYING OUT THE INVENTION

Figure 1:
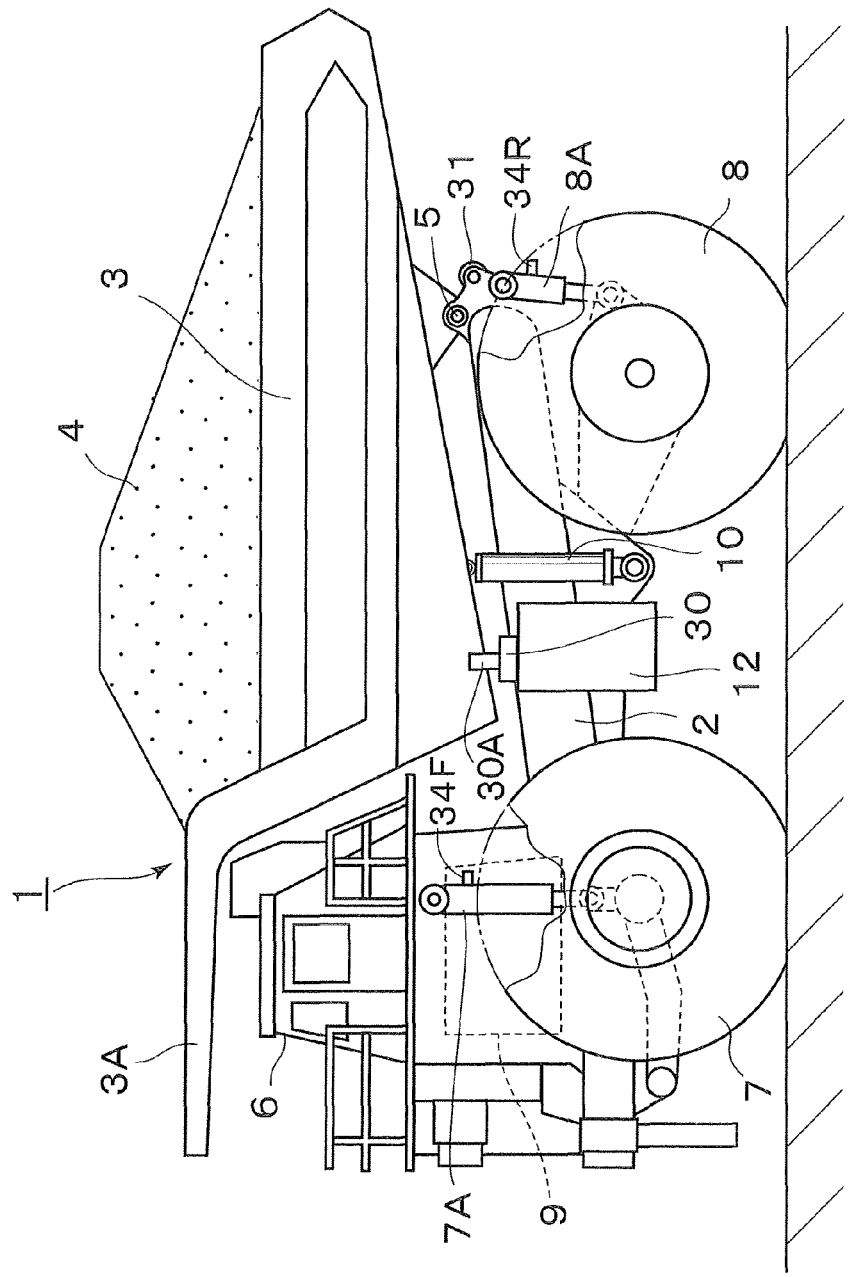
FIG. 1 is a front view showing a dump truck according to an embodiment of the present invention.

Hereinafter, a detailed description will be given by citing as an example a dump truck transporting crushed stones excavated in a mine as a transporter vehicle which is applied to an embodiment of the present invention with reference to FIG. 1 to FIG. 9.

In the figure, designated at 1 is a dump truck as a large-sized transporter vehicle, and the dump truck 1 is largely constituted by a vehicle body 2 having a rigid frame structure and a vessel 3 as a loading platform tiltably (liftably) mounted on the vehicle body 2.

The vessel 3 is formed as a large-sized container whose overall length reaches as much as 10 to 13 meters to load a large volume of heavy objects to be transported, such as crushed stones (hereinafter, called crushed stones 4). A rear side bottom portion of the vessel 3 is tiltably coupled to a rear end side of the vehicle body 2 by using a connecting pin 5. A protector 3A is integrally provided on a front side top portion of the vessel 3 in such a manner as to cover a cab 6 from an upper side thereof.

Figure 2:
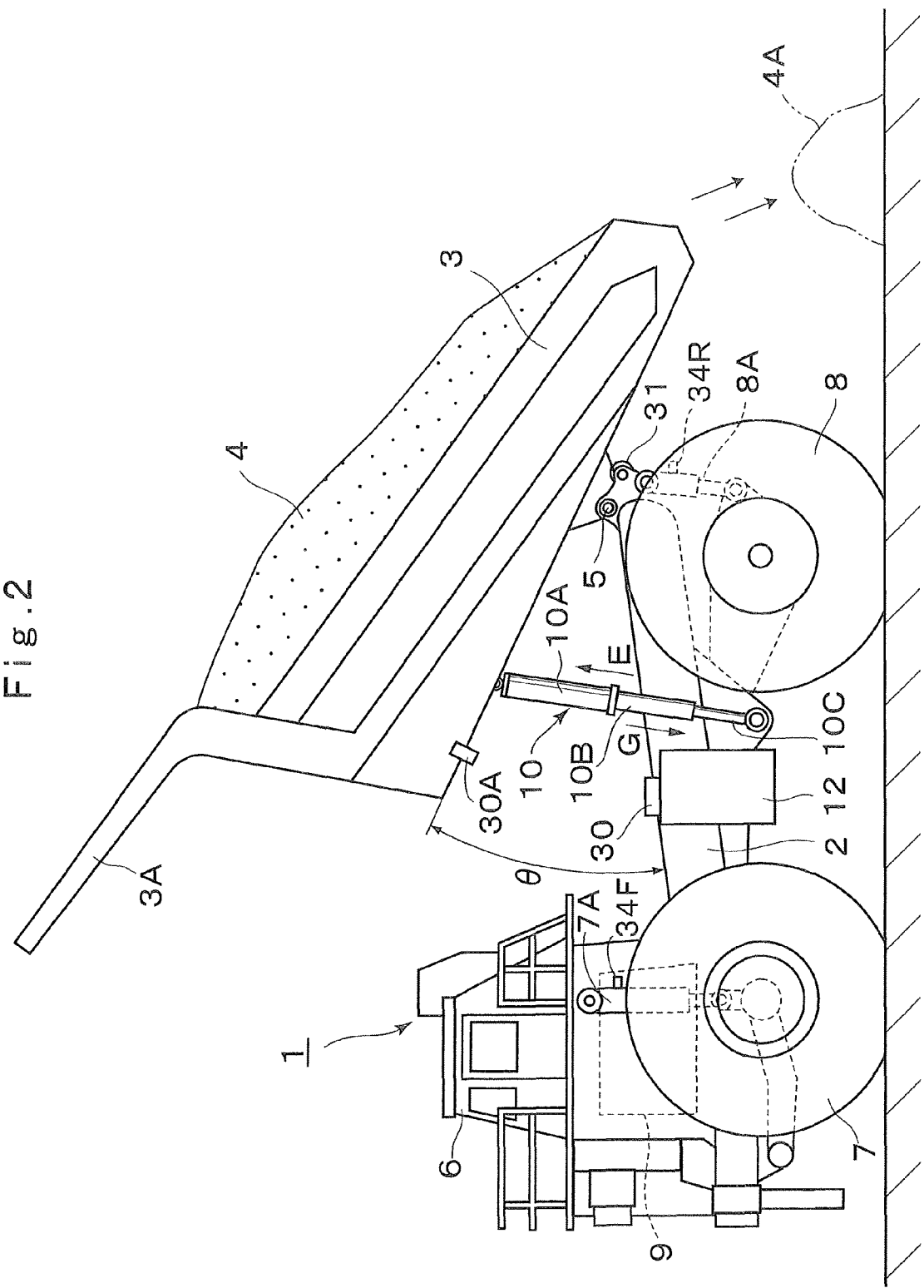
FIG. 2 is a front view showing a state in which a vessel of the dump truck is tilted obliquely backward.

Namely, the bottom side of the vessel 3 is rotatably supported by the rear side of the vehicle body 2 by using the connecting pin 5. Further, as a hoist cylinder 10 is expanded or contracted, the front side (side of the protector 3A) of the vessel 3 is rotated (raised or lowered) vertically by the use of the position of the connecting pin 5 as a fulcrum. In consequence, the vessel 3 is rotated between a transporting position shown in FIG. 1 and a dumping position shown in FIG. 2. For example, at the dumping position shown in FIG. 2, a large number of the crushed stones 4 loaded in the vessel 3 are dumped at a predetermined cargo collection site so as to slide down from the vessel 3 which has tilted backward. In FIG. 2, a part of the crushed stones 4 dumped from the vessel 3 is shown as a waste soil 4A.

Figure 3:
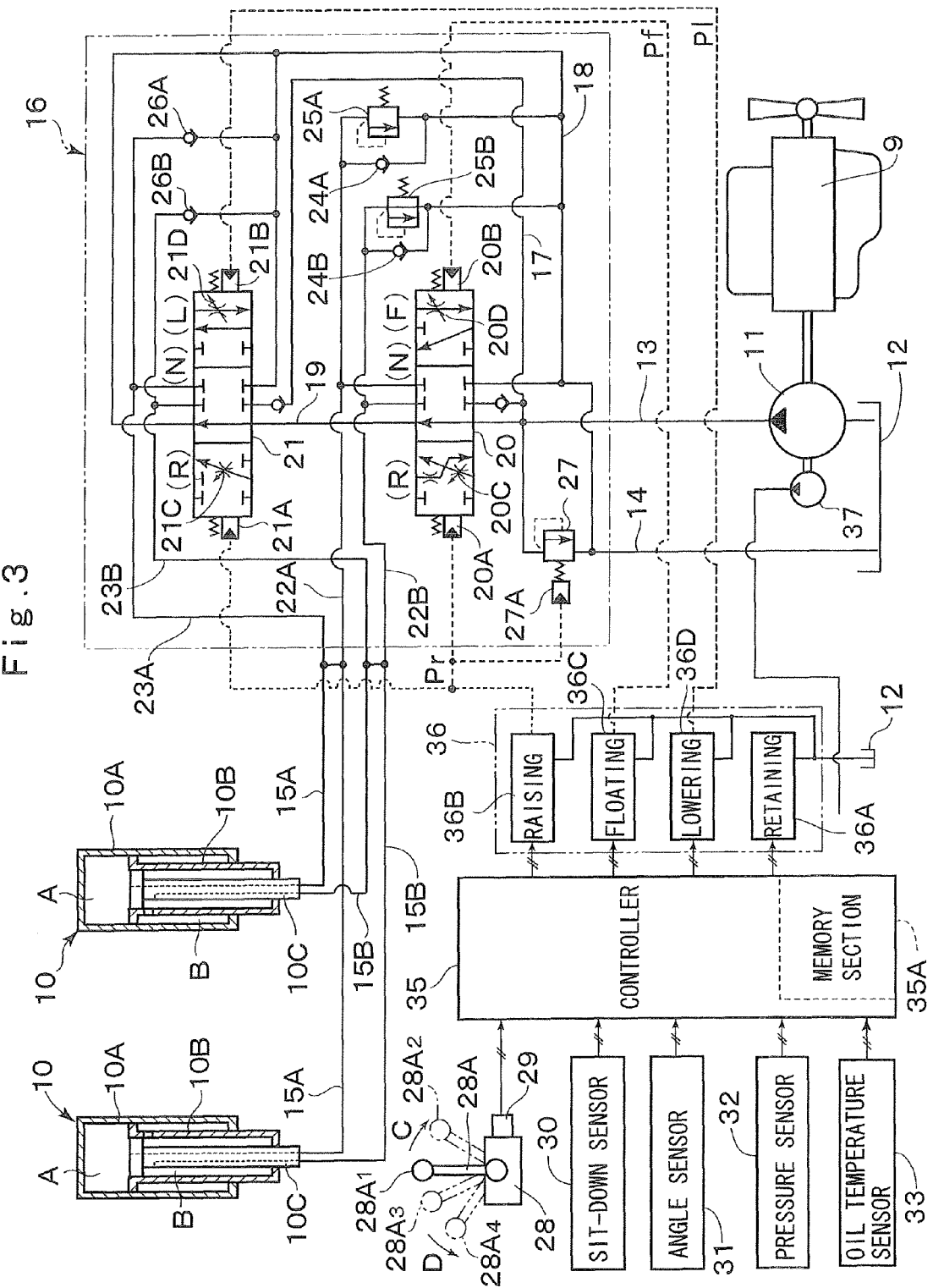
FIG. 3 is a control circuit diagram including a hydraulic circuit for operating and stopping a hoist cylinder.

Indicated at 6 is the cab which is provided in the front portion of the vehicle body 2 to be located under the lower side of the protector 3A. The cab 6 defines an operating room where an operator of the dump truck 1 gets in/off. An operator's seat, an accelerator pedal, a brake pedal, a handle for steering, an engine switch (any thereof is not shown), operating levers 28A to be described hereinafter (only one is illustrated in FIG. 3), and the like are provided inside the cab 6.

The protector 3A of the vessel 3 protects the cab 6 from flying stones such as rocks by almost completely covering the cab 6 from the upper side. In addition, the protector 3A has a function of protecting the operator inside the cab 6 at the time the vehicle (dump truck 1) falls down.

Indicated at 7 are right and left front wheels (only one is shown) which are provided rotatably on the front side of the vehicle body 2, and the front wheels 7 constitute steered wheels which are steered by an operator of the dump truck 1. The front wheel 7 is formed with a tire diameter (outside diameter dimension) of, for example, as much as 2 to 4 meters in the same way as rear wheels 8. A front suspension 7A constituted, for example, by hydraulic shock absorbers and the like is provided between the front portion of the vehicle body 2 and the front wheels 7. The front suspension 7A suspends the front side of the vehicle body 2 between the front wheels 7.

Indicated at 8 are right and left rear wheels (only one is shown) which are rotatably provided on the rear side of the vehicle body 2, and the rear wheels 8 constitute drive wheels of the dump truck 1 which are driven and rotated by a traveling drive unit (not shown). A rear suspension 8A constituted, for example, by hydraulic shock absorbers and the like is provided between the rear wheels 8 and the rear portion of the vehicle body 2. This rear suspension 8A supports the rear side of the vehicle body 2 between the rear wheels 8.

Indicated at 9 is an engine as a motor. This engine 9 is constituted, for example, by a large-sized diesel engine or the like. The engine 9 is provided in the vehicle body 2 to be located under the cab 6 and drives and rotates a hydraulic pump 11 shown in FIG. 3 and the like.

Denoted at 10 are a pair of right and left hoist cylinders telescopically provided between the vehicle body 2 and the vessel 3. This hoist cylinder 10 is formed of a multi-stage (for example, two-stage) hydraulic cylinder. As shown in FIG. 3, the hoist cylinder 10 is constituted by an outer tube portion 10A positioned at the outer side, an inner tube portion 10B telescopically provided inside the outer tube portion 10A to define an interior of the outer tube portion 10A with an upper side oil chamber A and a lower side oil chamber B, and a piston rod 10C telescopically provided inside the inner tube portion 10B.

The hoist cylinder 10 is configured such that, when pressurized oil is supplied into the oil chamber A from the hydraulic pump 11, the piston rod 10C expands downward to tilt (rotate) the vessel 3 diagonally backward by using the connecting pin 5 as a fulcrum (refer to FIG. 2). On the other hand, the hoist cylinder 10 is configured such that, when the pressurized oil (oil liquid) is supplied inside the oil chamber B from the hydraulic pump 11, the piston rod 10C is contracted to return the vessel 3 back to a transporting position (refer to FIG. 1) by being rotated downward by using the connecting pin 5 as a fulcrum.

Figure 4:
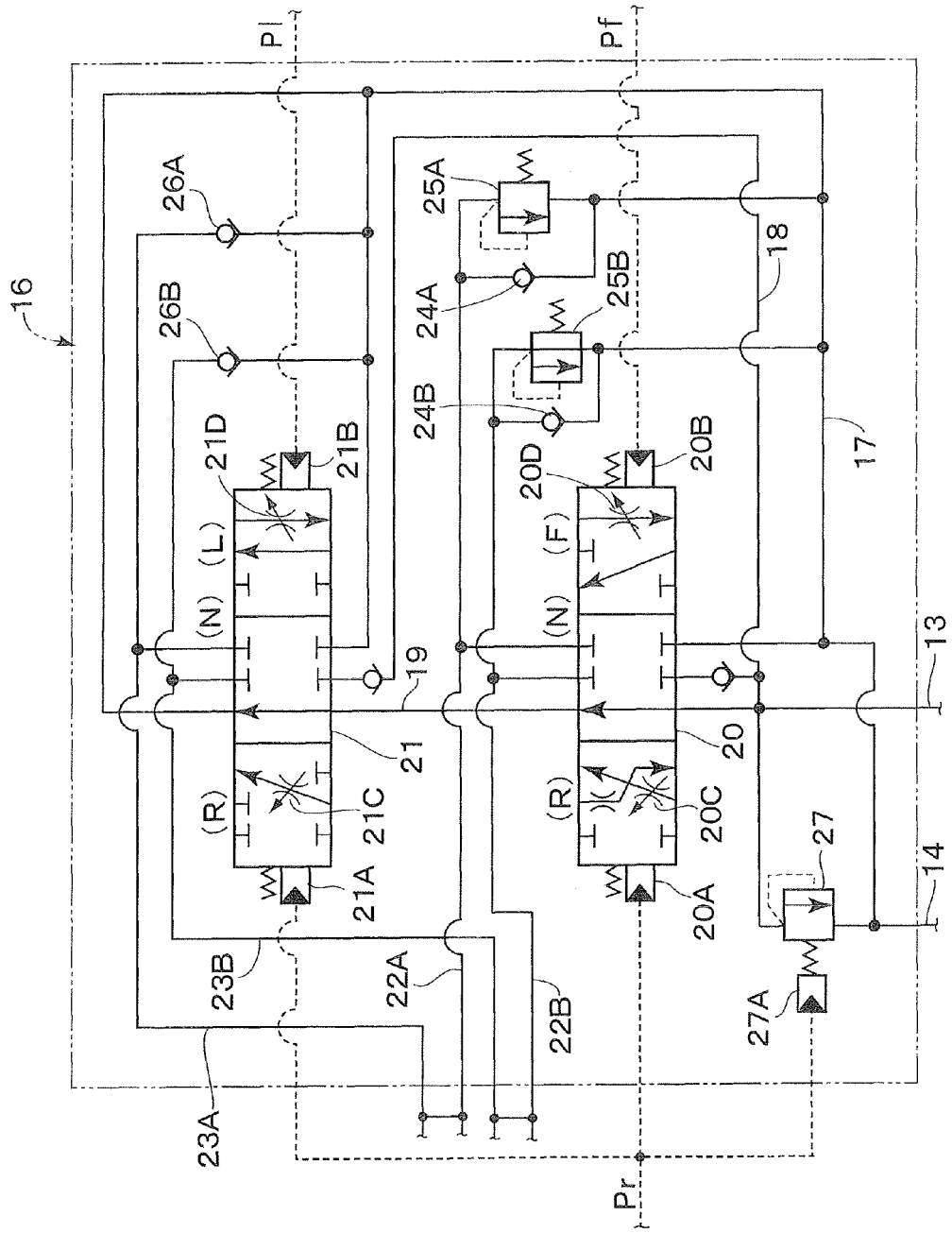
FIG. 4 is a hydraulic circuit diagram showing a control valve device in FIG. 3 in an enlarged state.

Next, the hydraulic circuit for driving the hoist cylinder 10 will be explained with reference to FIG. 3 and FIG. 4.

Denoted at 11 is the hydraulic pump. The hydraulic pump 11 constitutes a hydraulic source together with an operating oil tank 12 (hereinafter, called a tank 12). As shown in FIG. 1 and FIG. 2, the tank 12 is mounted on the side surface of the vehicle body 2 to be located under the vessel 3. The operating oil (oil liquid) accommodated inside the tank 12 is suctioned into the hydraulic pump 11 when the hydraulic pump 11 is driven and rotated by the engine 9. High-pressure oil is discharged into a pump line 13 from a discharge side of the hydraulic pump 11. On the other hand, the returned oil from the hoist cylinder 10 is discharged through a low-pressure tank line 14 to the tank 12.

Indicated at 15A and 15B are a pair of hydraulic conduits connected to the oil chambers A and B in each hoist cylinder 10. The hydraulic conduits 15A and 15B are connected through the control valve device 16 to be described hereinafter respectively to the hydraulic sources (the hydraulic pump 11 and the tank 12). The hydraulic conduits 15A and 15B serve to supply the pressurized oil from the hydraulic pump 11 to the oil chambers A and B in the hoist cylinder 10 or discharge the pressurized oil in the oil chambers A and B to the tank 12.

Designated at 16 is the control valve device provided among the hydraulic pump 11, the tank 12 and the hoist cylinder 10. As shown in FIG. 3 and FIG. 4, the control valve device 16 is largely constituted by a high-pressure side oil passage 17, a low-pressure side oil passage 18, a bypass oil passage 19, a first direction control valve 20, and a second direction control valve 21. In this case, the first direction control valve 20 and the second direction control valve 21 have a parallel connection with each other through the high-pressure side oil passage 17, the low-pressure side oil passage 18, and the bypass oil passage 19.

The high-pressure side oil passage 17 in the control valve device 16 is connected through the pump line 13 to a discharge side of the hydraulic pump 11 and the low-pressure side oil passage 18 connected through the tank line 14 to the tank 12. On the other hand, as shown in FIG. 3 and FIG. 4, the bypass oil passage 19 in the control valve device 16 establishes communication between the high-pressure side oil passage 17 and the low-pressure side oil passage 18 when each of the direction control valves 20 and 21 is in a neutral position (N). In consequence, the hydraulic pump 11 is in an unloading state and the discharge pressure (pressure inside the pump line 13) is held in a low-pressure state close to a tank pressure.

A pair of actuator side oil passages 22A and 22B are provided in the output side of the first direction control valve 20, and the actuator side oil passages 22A and 22B are connected through hydraulic conduits 15A and 15B respectively to the oil chambers A and B in the hoist cylinder 10. A pair of actuator side oil passages 23A and 23B are provided in the output side of the second direction control valve 21, and the actuator side oil passages 23A and 23B are connected through hydraulic conduits 15A and 15B respectively to the oil chambers A and B in the hoist cylinder 10.

Each of the direction control valves 20 and 21 in the control valve device 16 is constituted by a hydraulic pilot type direction control valve having six ports and three positions, for example. The first direction control valve 20 includes a pair of hydraulic pilot portions 20A and 20B. The first direction control valve 20 is switched from a neutral position (N) to a raising position (R) when a pilot pressure Pr to be described hereinafter is supplied to the hydraulic pilot portion 20A, and the first direction control valve 20 is switched from the neutral position (N) to a floating position (F) when a pilot pressure Pf to be described hereinafter is supplied to the hydraulic pilot portion 20B.

The first direction control valve 20 includes a first expansion side variable throttle portion 20C and a first contraction side variable throttle portion 20D. The first expansion side variable throttle portion 20C, when a signal for flow amount adjustment by duty control is outputted from a controller 35 to be described hereinafter to a raising pilot output portion 36B, variably adjusts a flow amount of the oil liquid as described hereinafter corresponding to the outputted signal. At this time, the first direction control valve 20 performs the flow amount adjustment by the first expansion side variable throttle portion 20C in a state of being switched to the raising position (R) in such a manner that an opening area as the flow passage area is in agreement with a target opening area St1 to be described hereinafter.

The first contraction side variable throttle portion 20D, when a signal for flow amount adjustment by duty control is outputted from the controller 35 to a floating pilot output portion 36C, adjusts the flow amount as described hereinafter corresponding to the outputted signal. At this time, the first direction control valve 20 performs the flow amount adjustment by the first contraction side variable throttle portion 20D in a state of being switched to the floating position (F) in such a manner that the opening area is in agreement with a target opening area St2 to be described hereinafter. It should be noted that unless the signal for flow amount adjustment is outputted from the controller 35, the variable throttle portions 20C and 20D do not perform the flow amount adjustment.

The second direction control valve 21 includes a pair of hydraulic pilot portions 21A and 21B. The second direction control valve 21 is switched from a neutral position (N) to a raising position (R) when a pilot pressure Pr is supplied to the hydraulic pilot portion 21A, and the second direction control valve 21 is switched from the neutral position (N) to a lowering position (L) when a pilot pressure Pl is supplied to the hydraulic pilot portion 21B.

The second direction control valve 21 includes a second expansion side variable throttle portion 21C and a second contraction side variable throttle portion 21D. The second expansion side variable throttle portion 21C, when a signal for flow amount adjustment by duty control is outputted from the controller 35 to the raising pilot output portion 36B, variably adjusts a flow amount of the oil liquid as described hereinafter corresponding to the outputted signal. At this time, the second direction control valve 21 performs the flow amount adjustment by the second expansion side variable throttle portion 21C in a state of being switched to the raising position (R) in such a manner that the opening area is in agreement with a target opening area St1.

The second contraction side variable throttle portion 21D, when a signal for throttling control by duty control is outputted from the controller 35 to a lowering pilot output portion 36D, variably adjusts a flow amount of the oil liquid as described hereinafter corresponding to the outputted signal. At this time, the second direction control valve 21 performs the flow amount adjustment by the second contraction side variable throttle portion 21D in a state of being switched to the lowering position (L) in such a manner that the opening area is in agreement with a target opening area St3. It should be noted that unless the signal for flow amount adjustment is outputted from the controller 35, the variable throttle portions 21C and 21D do not perform the flow amount adjustment.

Here, a case where the control valve device 16 is displaced to a retaining position will be explained. In this case, the control valve device 16 is in the retaining position for stopping a motion of each of the hoist cylinders 10 by arranging both of the first and second direction control valves 20 and 21 in the neutral position (N). In this retaining position, the supply and the discharge of the pressurized oil through the actuator side oil passages 22A and 22B and the actuator side oil passages 23A and 23B to and from each of the hoist cylinders 10 are stopped.

A case where the control valve device 16 is displaced to a raising position will be explained. In this case, both the first and second direction control valves 20 and 21 in the control valve device 16 are switched from the neutral position (N) to the raising position (R). First, when the first and second direction control valves 20 and 21 are displaced to the raising position (R), the pressurized oil from the hydraulic pump 11 is supplied through the pump line 13, the high-pressure side oil passage 17, the direction control valve 21, the actuator side oil passages 22A and 22B, and the hydraulic conduits 15A into the oil chamber A in each of the hoist cylinders 10. At this time, when the first direction control valve 20 is switched to the raising position (R), the oil liquid in the oil chamber B is returned through the hydraulic conduits 15B, the actuator side oil passage 22B, the direction control valve 20, the low-pressure side oil passage 18, and the tank line 14 to the tank 12.

In consequence, the piston rod 10C in each of the hoist cylinders 10 is expanded by the pressurized oil in the oil chamber A to raise the vessel 3 to a waste soil position shown in FIG. 2. Namely, at this time, the first and second direction control valves 20 and 21 in the control valve device 16 both are arranged in the raising position (R), and each of the hoist cylinders 10 is expanded by a hydraulic force in the direction of arrow E in FIG. 2 to raise the vessel 3 upward.

On the other hand, a case where the control valve device 16 is displaced to a floating position will be explained. In this case, the first direction control valve 20 in the control valve device 16 is switched from the neutral position (N) to the floating position (F), and the second direction control valve 21 is arranged to the neutral position (N). When the first direction control valve 20 is switched to the floating position (F), the actuator side oil passage 22A is connected through the direction control valve 20 to the low-pressure side oil passage 18 and the tank line 14. In addition, the actuator side oil passage 22B is connected through a check valve 24B to be described to the low-pressure side oil passage 18 and the tank line 14, and also the other actuator side oil passage 23B is connected through a check valve 26B to be described to the low-pressure side oil passage 18 and the tank line 14.

In consequence, each of the hoist cylinders 10 is contracted in the direction of arrow G in FIG. 2 according to the load (self-weight) from the vessel 3, and the oil liquid in the oil chamber A is discharged through the hydraulic conduits 15A, the actuator side oil passage 22A, and the direction control valve 20 to the tank 12, and the oil liquid in the tank 12 is resupplied from the check valves 24B and 26B to be described hereinafter through the actuator side oil passages 22B and 23B and the hydraulic conduits 15B into the oil chamber B. Namely, at this time, the first direction control valve 20 in the control valve device 16 is arranged in the floating position (F) for allowing the self-weight fall of the vessel 3.

Further, a case where the control valve device 16 is displaced to a lowering position will be explained. In this case, the first direction control valve 20 in the control valve device 16 is returned to the neutral position (N), and the second direction control valve 21 is switched from the neutral position (N) to the lowering position (L). Namely, when the second direction control valve 21 is displaced to the lowering position (L), the pressurized oil from the hydraulic pump 11 is supplied through the pump line 13, the high-pressure side oil passage 17, the second direction control valve 21, the actuator side oil passage 23B, and the hydraulic conduits 15B into the oil chamber B in each of the hoist cylinders 10. Meanwhile, the oil liquid in the oil chamber A is returned through the hydraulic conduits 15A, the actuator side oil passage 23A, the second direction control valve 21, the low-pressure side oil passage 18, and the tank line 14 to the tank 12.

In consequence, in each of the hoist cylinders 10, the inner tube portion 10B is contracted into the outer tube portion 10A together with the piston rod 10C due to the pressurized oil supplied inside the oil chamber B and the vessel 3 is rotated downward to the transporting position shown in FIG. 1 with a hydraulic force of each of the hoist cylinders 10. At this time, the direction control valve 21 in the control valve device 16 is displaced to the lowering position (L) and each of the hoist cylinders 10 is contracted by a hydraulic force in the direction of arrow G in FIG. 2 to lower the vessel 3 to a position to be seated on the vehicle body 2.

Indicated at 24A and 24B are check valves for makeup disposed in the side of the first direction control valve 20 in the control valve device 16. The check valves 24A and 24B are provided between the actuator side oil passages 22A and 22B and the low-pressure side oil passage 18 to bypass the first direction control valve 20. The check valves 24A and 24B allow the oil liquid in the tank 12 to flow from the low-pressure side oil passage 18 through the actuator side oil passages 22A and 22B, and the hydraulic conduits 15A and 15B to the oil chambers A and B in the hoist cylinder 10 and block a reverse flow thereof. The oil liquid resupplied through the check valves 24A and 24B to the oil chambers A and B in the hoist cylinder 10 prevents them from being in a negative pressure.

Indicated at 25A and 25B are relief valves for excessive load prevention provided in the control valve device 16. The relief valves 25A and 25B are provided between the actuator side oil passages 22A and 22B and the low-pressure side oil passage 18 to bypass the first direction control valve 20 and are connected in parallel with the check valves 24A and 24B. The relief valve 25A which is one of the relief valves 25A and 25B opens for relief of an excessive pressure in the side of the oil chamber A when an excessive load in the contraction direction is applied to the hoist cylinder 10. The other relief valve 25B opens for relief of an excessive pressure in the side of the oil chamber B when an excessive load in the expansion direction is applied to the hoist cylinder 10.

Indicated at 26A and 26B are check valves for makeup disposed in the side of the second direction control valve 21 in the control valve device 16. The check valves 26A and 26B are provided between the actuator side oil passages 23A and 23B and the low-pressure side oil passage 18 to bypass the second direction control valve 21. The check valves 26A and 26B allow the oil liquid in the tank 12 to flow from the low-pressure side oil passage 18 through the actuator side oil passages 23A and 23B, and the hydraulic conduits 15A and 15B to the oil chambers A and B in the hoist cylinder 10 and block a reverse flow thereof. Therefore, the check valves 26A and 26B resupply the oil liquid to the oil chambers A and B in the hoist cylinder 10.

Indicated at 27 is a relief valve provided between the high-pressure side oil passage 17 and the low-pressure side oil passage 18 in the control valve device 16, which allows a change of a relief setting pressure. The relief valve 27 determines the maximum discharge pressure of the hydraulic pump 11 and opens when the excessive pressure more than the maximum discharge pressure is generated, to relieve the excessive pressure to the side of the tank 12. The relief valve 27 includes a setting pressure variable portion 27A to which a pilot pressure Pr is supplied, and the relief setting pressure is switched to a high-pressure setting by the pilot pressure Pr.

That is, the relief valve 27 sets the relief setting pressure to a high-pressure to set a discharge pressure of the hydraulic pump 11 to a high-pressure when the direction control valves 20 and 21 are switched to the raising position (R) by supply of a pilot pressure Pr. On the other hand, when the supply of the pilot pressure Pr is stopped, the relief valve 27 switches the relief setting pressure to a low-pressure to prevent the pressure of the pressurized oil from increasing more than necessary. Therefore, the discharge pressure of the hydraulic pump 11 is set to a low-pressure when the first and second direction control valves 20 and 21 are switched to a position other than the raising position (R), namely, the neutral position (N), the floating position (F) or the lowering position (L).

Next, an operating device for supplying a pilot pressure to the first and second direction control valves 20 and 21 constituting the control valve device 16 will be explained with reference to FIG. 3.

Designated at 28 is the operating lever device as an operating device for performing a switching operation of the control valve device 16. The operating lever device 28 is constituted by an electric lever device, for example. The operating lever device 28 has an operating lever 28A manually operated to be tilted by an operator in the cab 6. The operating lever 28A is tilted to any of the retaining position, the raising position, the floating position and the lowering position corresponding to each switching position of the control valve device 16.

In this case, the operating lever 28A has a first returning position 28A1 shown in a solid line and a second returning position 28A3 shown in a two-dot chain line in FIG. 3. The operating lever 28A is usually displaced in the second returning position 28A3 corresponding to the floating position. Here, when the operating lever 28A is tilted in the direction of arrow C from the second returning position 28A3 shown in a two-dot chain line in FIG. 3, the operating lever 28A is displaced in a first tilting position 28A2 shown in a two-dot chain line and a pilot pressure Pr is outputted from the raising pilot output portion 36B in a pilot pressure generator 36. It should be noted that when an operator releases his or her hands from the operating lever 28A in a state of being in the first tilting position 28A2, the operating lever 28A automatically returns back to the first returning position 28A1 shown in a solid line in FIG. 3 by a returning spring (not shown).

On the other hand, when an operator tilts the operating lever 28A against the returning spring from the first returning position 28A1 shown in a solid line to the second returning position 28A3 shown in a two-dot chain line in FIG. 3, the operating lever 28A is self-retained in this position. At this time, a pilot pressure Pf is outputted from a floating pilot output portion 36C.

Further, when the operating lever 28A is tilted in the direction of arrow D from the second returning position 28A3, the operating lever 28A is displaced to a second tilting position 28A4 shown in a two-dot chain line, and a pilot pressure Pl is outputted from a lowering pilot output portion 36D. In addition, when an operator releases his or her hands from the operating lever 28A in a state of being in the second tilting position 28A4, the operating lever 28A automatically returns back to the second returning position 28A3 by the other returning spring (not shown).

Denoted at 29 is a lever sensor as operation detecting means attached to the operating lever device 28. The lever sensor 29 detects an operating position of the operating lever 28A by the operator and outputs the detection signal to the controller 35. In this case, the lever sensor 29 constitutes the operation detecting means and serves to detect to which position among the respective switching positions the control valve device 16 controlled to be switched by the operating lever device 28 is displaced.

Denoted at 30 is a sit-down sensor which detects whether or not the vessel 3 is seated on the vehicle body 2. As shown in FIG. 1 and FIG. 2, the sit-down sensor 30 is formed of a contact type sensor which is positioned on the top side of the tank 12 to be disposed in the side of the vehicle body 2. The sit-down sensor 30 detects whether a projecting object 30A as a detection target provided in the side of the vessel 3 is in contact with or away from the sit-down sensor 30. Namely, the sit-down sensor 30 is configured as a tilting state detector for detecting a behavior of the vessel 3 on the vehicle body 2 (in what tilting state the vessel 3 is) and outputs the detection signal to the controller 35.

Denoted at 31 is an angle sensor as the other tilting state detector adopted in the present embodiment. The angle sensor 31 is provided in the rear side of the vehicle body 2 to be positioned in the vicinity of the connecting pin 5 shown in FIG. 1 and FIG. 2. The angle sensor 31 detects a tilting angle of the vessel 3 to the vehicle body 2 as an angle θ illustrated in FIG. 2 and outputs the detection signal to the controller 35.

Denoted at 32 is a pressure sensor as a weight detector for detecting a weight of objects to be transported which are loaded in the vessel 3. The pressure sensor 32 detects a load pressure in the hoist cylinder 10 as a cylinder pressure P (refer to FIG. 6) in each of the oil chambers A and B and outputs the detection signal to the controller 35. Therefore, the pressure sensor 32 is mounted to the hoist cylinder 10 or a connecting section between hydraulic conduits 15A and 15B. The side of the controller 35 can identify a weight in the side of the vessel 3, namely, a size of an object to be transported, presence/absence of the object loading, and the like according to the detection signal from the pressure sensor 32.

Denoted at 33 is an oil temperature sensor for detecting a temperature of an oil liquid. The oil temperature sensor 33 detects a temperature of an oil liquid to be supplied to the hoist cylinder 10 or a temperature of returned oil to be discharged to the side of the tank 12 from the hoist cylinder 10, and outputs the detection signal to the controller 35. Namely, the oil liquid flowing in each of the direction control valves 20 and 21 in the control valve device 16 has a viscosity resistance changing corresponding to the temperature, and a flow amount thereof also changes with the change of the viscosity resistance. Therefore, a characteristic value of an adjustment flow amount is changed as shown in characteristic lines 38, 39, and 40 to be described hereinafter as shown in FIG. 6, according to a temperature of the oil liquid (oil temperature T) detected by the oil temperature sensor 33 to correct the flow amount in such a manner as to eliminate an influence of the viscosity resistance accompanying the temperature change of the oil liquid.

Denoted at 34F and 34R are other pressure sensors, and the pressure sensor 34F of the one constitutes a front wheel side pressure sensor 34F, and the pressure sensor 34R of the other constitutes a rear wheel side pressure sensor 34R. Namely, as shown in FIG. 1 and FIG. 2, the front wheel side pressure sensor 34F is provided in a front suspension 7A in the side of a front wheel 7. The rear wheel side pressure sensor 34R is provided in a rear suspension 8A in the side of a rear wheel 8. Here, the front wheel side pressure sensor 34F detects an inner pressure in the front suspension 7A, and the rear wheel side pressure sensor 34R detects an inner pressure in the rear suspension 8A. It is known that a pressure value of the inner pressure of each of the front suspension 7A and the rear suspension 8A detected by each of the pressure sensors 34F and 34R changes with a weight change in the side of the vessel 3. Therefore, the weight of the object loaded in the vessel 3 can be detected by the pressure sensors 34F and 34R.

Designated at 35 is the controller as control means composed of a microcomputer, and the controller 35 has an input side connected to the lever sensor 29, the sit-down sensor 30, the angle sensor 31, the pressure sensor 32, the oil temperature sensor 33, and the like, and an output side connected to the pilot pressure generator 36 and the like. The controller 35 is provided with a memory section 35A composed of a ROM, a RAM, an involatile memory, and the like.

Figure 5:
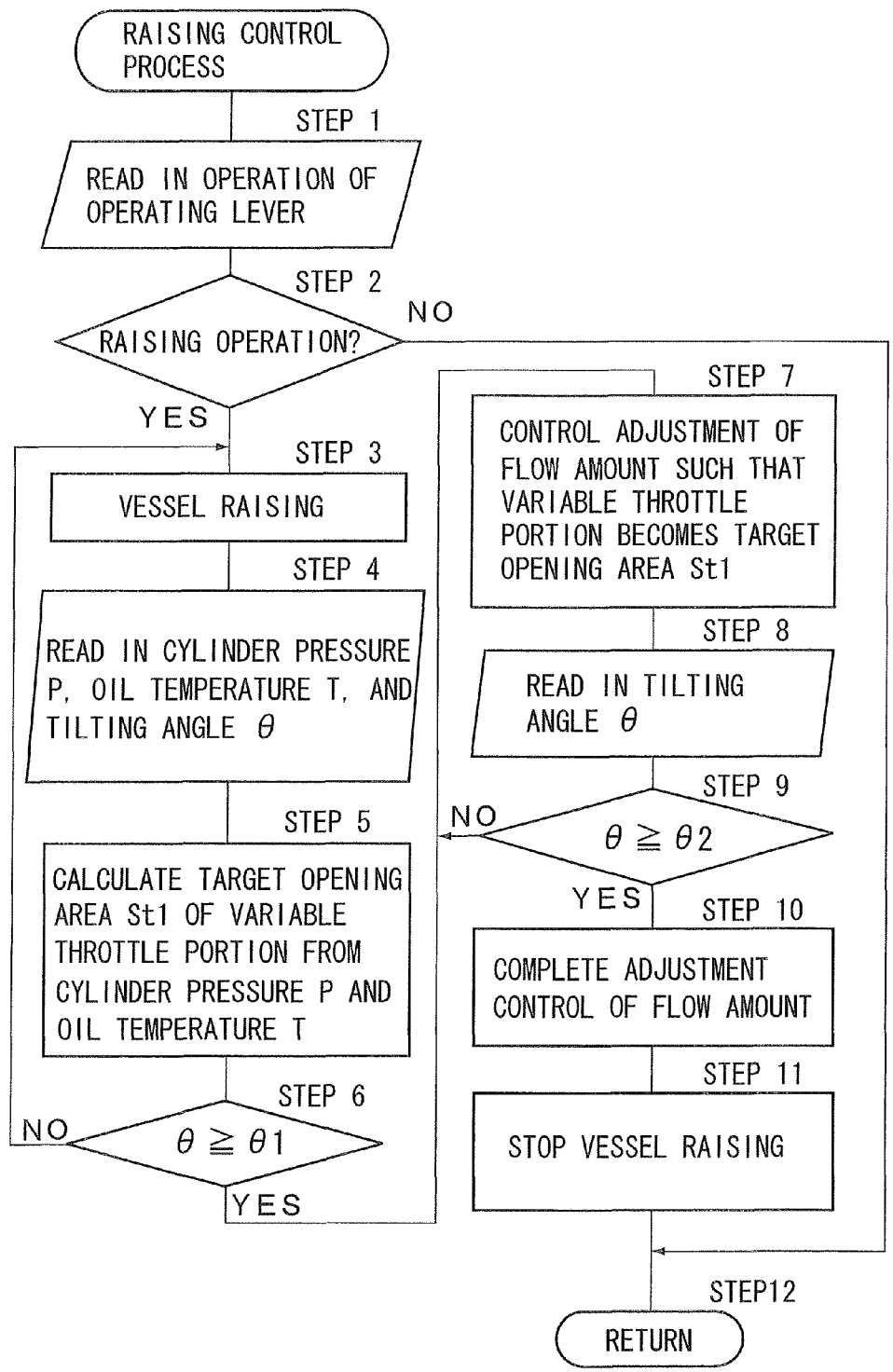
FIG. 5 is a flow chart showing a raising control process of the vessel through the control valve device by a controller in FIG. 3.
Figure 6:
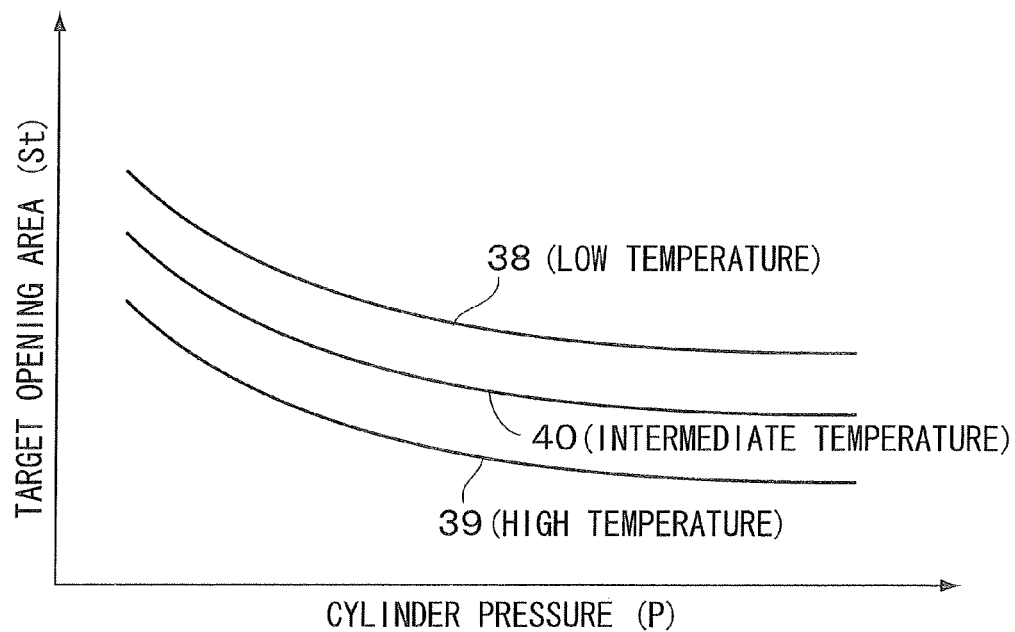
FIG. 6 is a characteristic line diagram showing a relation among a cylinder pressure of the hoist cylinder, an opening area of the control valve device, and an oil liquid temperature, as a control map for flow amount adjustment.
Figure 7:
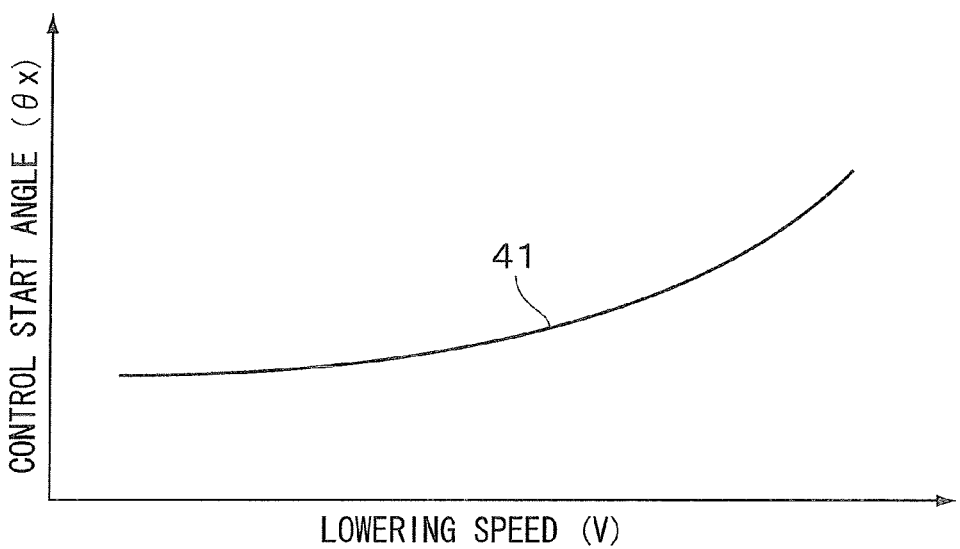
FIG. 7 is a characteristic line diagram showing a relation between a lowering speed of the vessel and a control start angle of the flow amount adjustment.
Figure 8:
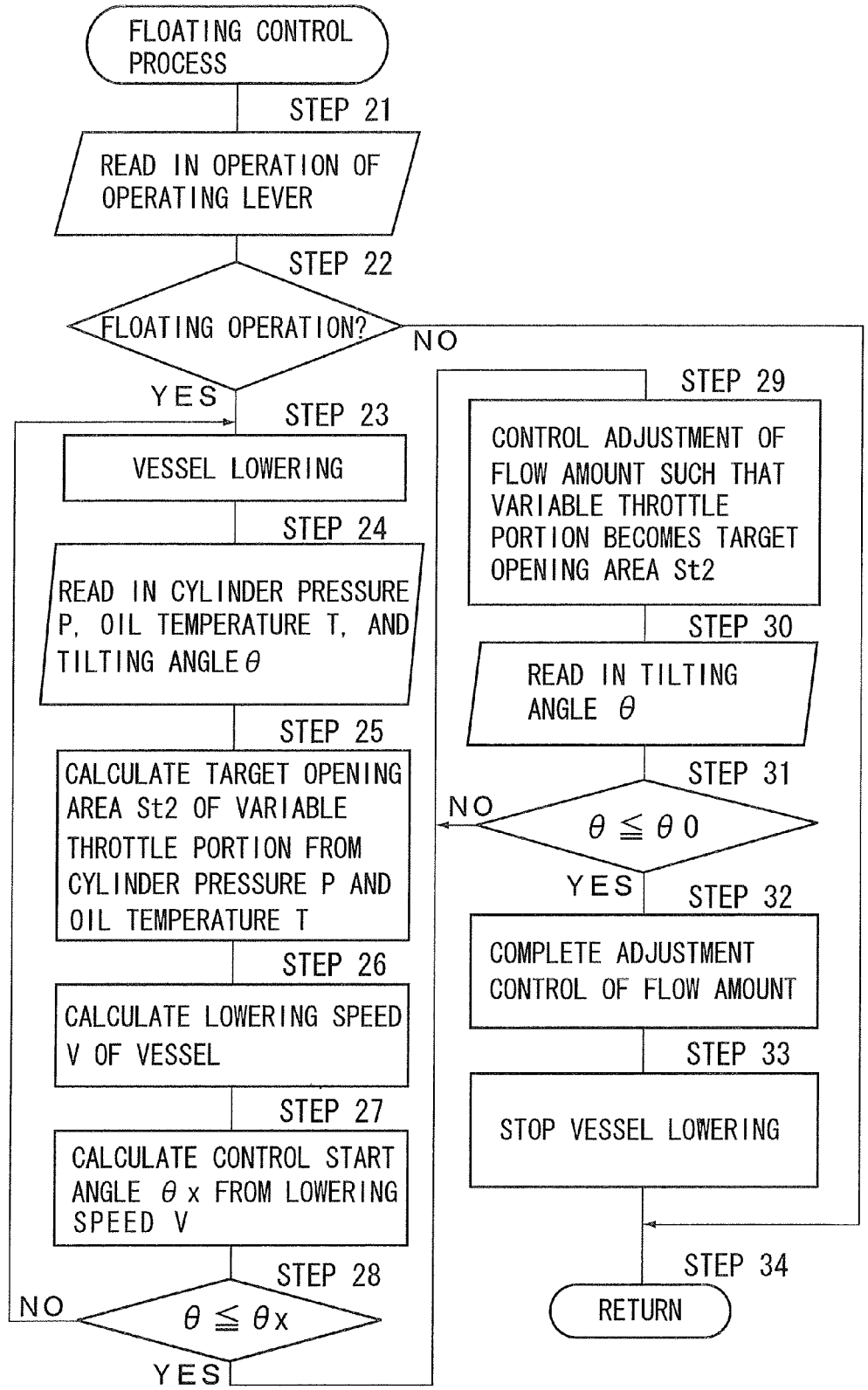
FIG. 8 is a flow chart showing a floating control process of the vessel through the control valve device by the controller in FIG. 3.
Figure 9:
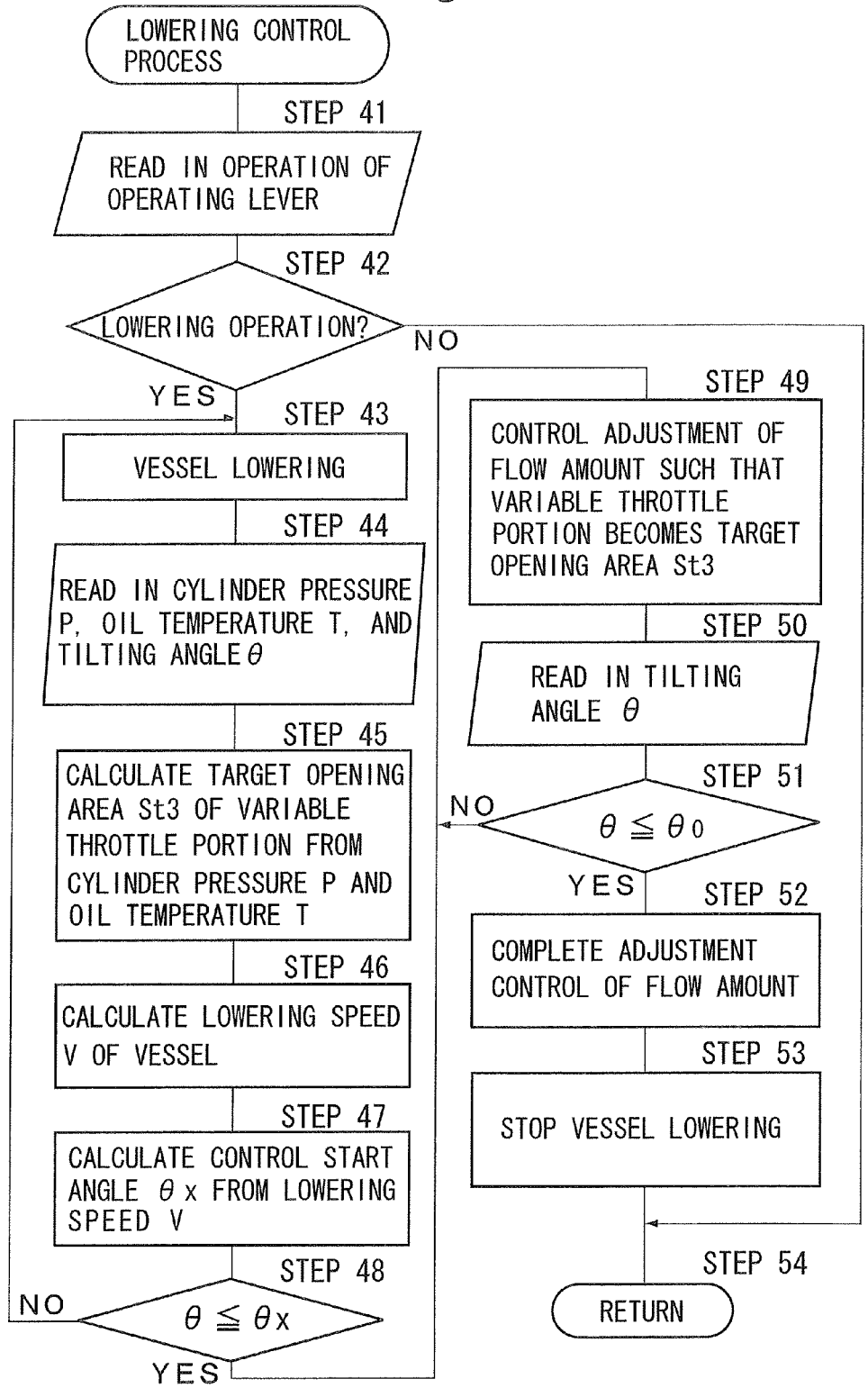
FIG. 9 is a flow chart showing a lowering control process of the vessel through the control valve device by the controller in FIG. 3.

A program for a raising control process shown in FIG. 5, a program for a floating control process shown in FIG. 8, a program for lowering control process shown in FIG. 9, a control map for flow amount adjustment shown in FIG. 6, a characteristic map showing a relation between a lowering speed V of the vessel 3 and a control start angle θx of flow amount adjustment shown in FIG. 7, a lowering stop angle θ0 (for example, θ0=0 to 2 degrees), a determination angle θ1 (for example, θ1=45 to 53 degrees), a raising stop angle θ2 (for example, θ2=55 to 57 degrees), and the like are stored in the memory section 35A in the controller 35.

Here, the controller 35 performs the switching control of the control valve device 16 of raising the vessel 3 obliquely upward according to the processing program in FIG. 5 or lowering the vessel 3 according to the processing programs in FIG. 8 and FIG. 9. The controller 35 reads in detection signals from the lever sensor 29, the angle sensor 31, the pressure sensor 32, and the oil temperature sensor 33 in the midst of the switching control, and when it is determined that the hoist cylinder 10 during the telescopic motion is close to a stop position, performs the adjustment process of the flow amount by switching the control valve device 16 in such a manner as to variably control the telescopic speed of the hoist cylinder 10 corresponding to a load pressure (cylinder pressure P).

Denoted at 36 is the pilot pressure generator connected to the output side of the controller 35, and the pilot pressure generator 36 is constituted by an electricity-hydraulic conversion device including an electromagnetic proportional valve. As shown in FIG. 3, the pilot pressure generator 36 converts an electrical control signal from the controller 35 to a pilot pressure Pr, Pf or Pl as a pressure signal. Therefore, the pilot pressure generator 36 is provided with four pilot output portions composed of the retaining pilot output portion 36A, the raising pilot output portion 36B, the floating pilot output portion 36C, and the lowering pilot output portion 36D.

Here, the pilot pressure generator 36, when a signal for flow amount adjustment is outputted to the raising pilot output portion 36B from the controller 35 in a state of supplying a pilot pressure Pr to the hydraulic pilot portions 20A and 21A for switching the first and second direction control valves 20 and 21 to a raising position (R), changes the pilot pressure Pr, for example, within a range of 50 to 100%. In consequence, the first and second direction control valves 20 and 21 having been switched to the raising position (R) operate the expansion side variable throttle portions 20C and 21C in such a manner as to adjust a flow amount of the oil liquid flowing inside the first and second direction control valves 20 and 21 from the high-pressure side oil passage 17 toward the actuator side oil passages 22A and 23A in a range of a flow amount corresponding to 50 to 100%, for example.

As a result, the pressurized oil supplied to the oil chamber A of each of the hoist cylinders 10 through the pump line 13, the high-pressure side oil passage 17, the first and second direction control valves 20 and 21, the actuator side oil passages 22A and 23A, and each of the hydraulic conduits 15A from the hydraulic pump 11 is variably adjusted in the flow amount by the expansion side variable throttle portions 20C and 21C to control the hoist cylinder 10 in such a manner that the expansion speed becomes an appropriate speed.

On the other hand, the pilot pressure generator 36, when a signal for flow amount adjustment is outputted to the floating pilot output portion 36C from the controller 35 in a state of supplying a pilot pressure Pf to the hydraulic pilot portion 20B for switching the first direction control valve 20 to a floating position (F), changes the pilot pressure Pf, for example, within a range of 50 to 100%. In consequence, the first direction control valve 20 having been switched to the floating position (F) operates the first contraction side variable throttle portion 20D in such a manner as to adjust a flow amount of the oil liquid flowing inside the first direction control valve 20 from the side of the actuator side oil passage 22A toward the low-pressure side oil passage 18 in a range of a flow amount corresponding to 50 to 100%, for example.

As a result, the oil liquid discharged from the oil chamber A of each of the hoist cylinders 10 through the hydraulic conduits 15A, the actuator side oil passages 22A, and the first direction control valve 20 to the tank 12 is variably adjusted in the flow amount by the first contraction side variable throttle portion 20D to control the hoist cylinder 10 in such a manner that the contraction speed becomes an appropriate speed.

Further, the pilot pressure generator 36, when a signal for flow amount adjustment is outputted to the lowering pilot output portion 36D from the controller 35 in a state of supplying a pilot pressure Pl to the hydraulic pilot portion 21B for switching the second direction control valve 21 to a lowering position (L), changes the pilot pressure Pl, for example, within a range of 50 to 100%. In consequence, the second direction control valve 21 having been switched to the lowering position (L) operates the second contraction side variable throttle portion 21D in such a manner as to adjust a flow amount of the oil liquid flowing inside the second direction control valve 21 from the side of the actuator side oil passage 23A toward the low-pressure side oil passage 18 in a range of a flow amount corresponding to 50 to 100%, for example.

As a result, the oil liquid discharged from the oil chamber A of each of the hoist cylinders 10 through the hydraulic conduits 15A, the actuator side oil passage 23A, and the second direction control valve 21 to the tank 12 is variably adjusted in the flow amount by the second contraction side variable throttle portion 21D to control the hoist cylinder 10 in such a manner that the contraction speed becomes an appropriate speed.

Denoted at 37 is a pilot pump constituting a pilot hydraulic source together with the tank 12, and the pilot pump 37 is driven by an engine 9 together with the hydraulic pump 11 shown in FIG. 3. The pilot pump 37 supplies the pressurized oil, for example, in the order of 0.5 to 5.0 Mpa (mega pascal) to the pilot pressure generator 36. Further, the pilot pressure generator 36 outputs the pressurized oil from the pilot pump 37 as a pilot pressure Pr, Pf or Pl, for example.

In this case, in a case where the operating lever 28A of the operating lever device 28 is arranged in the first returning position 28A1 shown in a solid line in FIG. 3, the controller 35 outputs a control signal to the retaining pilot output portion 36A in the pilot pressure generator 36. Therefore, the pilot pressure generator 36 lowers all of the pilot pressures Pr, Pf, and Pl to a pressure close to the tank pressure. Accordingly, the first and second direction control valves 20 and 21 both are retained in the neutral position (N) such that the control valve device 16 is in the retaining position.

Next, in a case where the operating lever 28A is tilted in the direction of arrow C from the first returning position 28A1 shown in a solid line in FIG. 3 to the first tilting position 28A2, the controller 35 outputs a control signal to the raising pilot output portion 36B in the pilot pressure generator 36. Therefore, the pilot pressure generator 36 supplies the pilot pressure Pr to the hydraulic pilot portions 20A and 21A in the first and second direction control valves 20 and 21 from the raising pilot output portion 36B. Accordingly, the first and second direction control valves 20 and 21 both are switched from the neutral position (N) to the raising position (R) in the control valve device 16.

Next, in a case where the operating lever 28A is tilted from the first returning position 28A1 shown in a solid line to the second returning position 28A3 shown in a two-dot chain line in FIG. 3, the operating lever 28A is self-retained in this position, and also the controller 35 outputs a control signal to the floating pilot output portion 36C in the pilot pressure generator 36. At this time, for switching the first direction control valve 20 in the control valve device 16 from the neutral position (N) to the floating position (F), the pilot pressure Pf is supplied to the hydraulic pilot portion 20B in the first direction control valve 20 from the floating pilot output portion 36C in the pilot pressure generator 36. It should be noted that at this time, the pilot pressures Pr and Pl both are lowered to a pressure close to the tank pressure and the second direction control valve 21 is returned back to the neutral position (N).

Further, in a case where the operating lever 28A is tilted in the direction of arrow D from the second returning position 28A3 shown in a two-dot chain line in FIG. 3 to a second tilting position 28A4, the controller 35 outputs a control signal to the lowering pilot output portion 36D in the pilot pressure generator 36. At this time, for switching the second direction control valve 21 in the control valve device 16 from the neutral position (N) to the lowering position (L), the pilot pressure Pl is supplied to the hydraulic pilot portion 21B in the second direction control valve 21 from the lowering pilot output portion 36D in the pilot pressure generator 36. It should be noted that at this time, the pilot pressures Pr and Pf both are lowered to a pressure close to the tank pressure and the first direction control valve 20 is returned back to the neutral position (N).

Next, a control map for flow amount adjustment shown in FIG. 6 will be explained. A characteristic line 38 shows characteristics for flow amount adjustment suitable for a case where an oil temperature T of an oil liquid is low. Namely, in a case where the oil temperature T is low, a viscosity resistance of the oil liquid becomes high. Therefore, a flow amount of the oil liquid largely varies with a change of an opening area of each of the variable throttle portions 20C, 20D, 21C, and 21D. Accordingly, the characteristic line 38, in a case where the oil temperature T is low, controls a target opening area St by the direction control valves 20 and 21 in the control valve device 16 to be gradually reduced corresponding to a cylinder pressure P in the hoist cylinder 10 and is set in such a manner that the target opening area St is relatively large as compared to that of a characteristic line 39 in a case where the oil temperature T is high, for example.

The characteristic line 39 shows characteristics for flow amount adjustment suitable for a case where the oil temperature T of the oil liquid is high. Accordingly, the characteristic line 39, in a case where the oil temperature T is high, controls the target opening area St by the direction control valves 20 and 21 in the control valve device 16 to be gradually reduced corresponding to a cylinder pressure P in the hoist cylinder 10 and is set in such a manner that the target opening area St is relatively small as compared to that of the characteristic line 38 in a case where the oil temperature T is low, for example. In addition, a characteristic line 40 shows characteristics for flow amount adjustment suitable for a case where the oil temperature T of the oil liquid is an intermediate temperature. The characteristic line 40 sets the target opening area St such that the oil temperature T is an intermediate value between the characteristic line 38 in a case where the oil temperature T is low and the characteristic line 39 in a case where the oil temperature T is high.

A characteristic line 41 shown in FIG. 7 corrects timing of starting flow amount adjustment control to be described hereinafter in relation to a lowering speed V when the vessel 3 is lowered, and a control start angle θx is set in such a manner as to be gradually large corresponding to the lowering speed V. The lowering speed V is found, for example, by differentiating a tilting angle θ of the vessel 3 detected by the angle sensor 31.

The dump truck 1 according to the present embodiment is configured as described above. Next, the operation of the dump truck 1 will be explained.

First, in a stone crushing site as a mine, for example, a large-sized hydraulic excavator (not shown) is used to load crushed stones 4 as objects to be transported on the vessel 3. At this time, the vessel 3 is placed in a transporting position shown in FIG. 1, and the dump truck 1 transports the crushed stones 4 to a cargo collection site in a state where a large number of the crushed stones 4 are loaded on the vessel 3.

In the cargo collection site, an operator in the cab 6 manually tilts the operating lever 28A in the operating lever device 28 in the direction of the arrow C from the second returning position 28A3 to the first tilting position 28A2 shown in a two-dot chain line in FIG. 3. In consequence, a control signal is outputted to the raising pilot output portion 36B in the pilot pressure generator 36 from the controller 35. As a result, a pilot pressure Pr is supplied to the hydraulic pilot portions 20A and 21A in the first and second direction control valves 20 and 21 from the raising pilot output portion 36B in the pilot pressure generator 36.

At this time, in the control valve device 16, the first direction control valve 20 is switched from the neutral position (N) to the raising position (R) and the second direction control valve 21 is also switched from the neutral position (N) to the raising position (R). Therefore, the pressurized oil from the hydraulic pump 11 is delivered through the pump line 13, the high-pressure side oil passage 17, the first and second direction control valves 20 and 21, the actuator side oil passages 22A and 22B, and the hydraulic conduits 15A to the oil chamber A in each of the two hoist cylinders 10. On the other hand, the oil liquid in the oil chamber B is returned through the hydraulic conduits 15B, the actuator side oil passage 22B, the first direction control valve 20, the low-pressure side oil passage 18 and the tank line 14 to the tank 12.

As a result, the piston rod 10C in the hoist cylinder 10 expands by the pressurized oil in the oil chamber A to raise the vessel 3 to the dumping position shown in FIG. 2 in such a manner as to tilt the vessel 3 diagonally backward. At this time, the dump truck 1 rotates the vessel 3 to a tilting posture as shown in FIG. 2 by the use of the connecting pin 5 as a fulcrum. Therefore, the crushed stones 4 in the vessel 3 are dumped to the cargo collection site in such a manner as to slide downward.

At this time, when an operator releases its hand from the operating lever 28A, the operating lever 28A automatically returns to the first returning position 28A1 shown in FIG. 3 by the returning spring. Therefore, a control signal is outputted to the retaining pilot output portion 36A in the pilot pressure generator 36 from the controller 35 to decrease all of the pilot pressures Pr, Pf and Pl from the pilot pressure generator 36 to a pressure close to the tank pressure.

Accordingly, the first and second direction control valves 20 and 21 in the control valve device 16 is automatically returned to the neutral position (N) to stop the supply or the discharge of the pressurized oil to or from the oil chambers A and B in the hoist cylinder 10. Thereby the hoist cylinder 10 can maintain the piston rod 10C in an expanding state and temporarily stop the vessel 3 as it is maintained in the tilting posture shown in FIG. 2.

Next, when the dumping operation of the crushed stones 4 is completed, an operator manually tilts the operating lever 28A from the first returning position 28A1 to the second returning position 28A3 shown in a two-dot chain line in FIG. 3. As a result, a control signal is outputted to the floating pilot output portion 36C in the pilot pressure generator 36 from the controller 35. Therefore, the pilot pressure generator 36 outputs a pilot pressure Pf to the hydraulic pilot portion 20B in the first direction control valve 20 from the floating pilot output portion 36C to switch the direction control valve 20 to the floating position (F). In addition, the second direction control valve 21 is automatically returned to the neutral position (N).

In consequence, the first direction control valve 20 switched to the floating position (F) connects the actuator side oil passage 22A to the low-pressure side oil passage 18 and the tank line 14. Namely, the actuator side oil passage 22B is connected through a check valve 24B to the low-pressure side oil passage 18 and the tank line 14, and the actuator side oil passage 23B is connected through a check valve 26B to the low-pressure side oil passage 18 and the tank line 14.

As a result, the hoist cylinder 10 is contracted in the direction of arrow G in FIG. 2 according to a load (self-weight) from the vessel 3, and the oil liquid in the oil chamber A is discharged toward the tank 12 and also the oil liquid in the tank 12 is resupplied through the check valves 24B and 26B into the oil chamber B. Accordingly, the hoist cylinder 10 allows the falling of the vessel 3 due to the self-weight thereof to lower the vessel 3 to the transporting position shown in FIG. 1 and seat the vessel 3 on the vehicle body 2.

On the other hand, when the dump truck 1 is tilted due to the bumpy ground, the sloping ground and the like in the operation site, even if the first direction control valve 20 in the control valve device 16 is switched to the floating position (F), the vessel 3 does not possibly fall down by the self-weight. In such a case, however, an operator tilts the operating lever 28A until the second tilting position 28A4 in the direction of arrow D in FIG. 3. Accordingly, the controller 35 can output a control signal to the lowering pilot output portion 36D in the pilot pressure generator 36.

Therefore, the pilot pressure generator 36 outputs a pilot pressure Pl in response to the control signal from the lowering pilot output portion 36D to the hydraulic pilot portion 21B in the second direction control valve 21 to switch the second direction control valve 21 to the lowering position (L). In consequence, the second direction control valve 21 has been switched to the lowering position (L) supplies the pressurized oil from the hydraulic pump 11 through the pump line 13, the high-pressure side oil passage 17, the actuator side oil passage 23B, and the hydraulic conduits 15B into the oil chamber B in each of the hoist cylinders 10 and returns the oil liquid in the oil chamber A through the hydraulic conduits 15A, the actuator side oil passage 23A, the second direction control valve 21, the low-pressure side oil passage 18, and the tank line 14 to the tank 12.

Thereby the hoist cylinder 10 is operated in such a manner that the inner tube portion 10B contracts into the outer tube portion 10A together with the piston rod 10C by the pressurized oil supplied into the oil chamber B, making it possible to rotate the vessel 3 downward to the transporting position as shown in FIG. 1 by the hydraulic force of the hoist cylinder 10 to forcibly seat the vessel 3 on the vehicle body 2.

Further, the operator in the dump truck 1 returns the operating lever 28A to the second returning position 28A3 shown in a two-dot chain line in FIG. 3 at the traveling of the vehicle to be self-retained therein. Therefore, the control valve device 16 is operated such that the first direction control valve 20 is switched to the floating position (F) and the second direction control valve 21 is returned to the neutral position (N). Accordingly, the vessel 3 continues to be seated on the vehicle body 2 due to the self-weight and the hoist cylinder 10 also can be maintained in a contracted state using the self-weight of the vessel 3 side.

Incidentally, in the hoist cylinder 10, the expansion speed or the contraction speed is generally not adjusted before the hoist cylinder 10 stops. Therefore, at a point where the vessel 3 is displaced to the dumping position or transporting position and an tilting angle θ of the vessel 3 reaches a predetermined angle (raising stop angle θ2 or lowering stop angle θ0 to be described hereinafter), when the telescopic motion of the hoist cylinder 10 is stopped, in some cases a shock at the stopping generated accompanying the stop of the telescopic motion may become large due to the weight of objects to be transported. In addition, in a vacant state of the object loading, there are some cases where the expansion motion of the hoist cylinder 10 is excessively quick or the contraction motion of the hoist cylinder 10 is slow, thereby taking extra hours.

Therefore, according to the present embodiment, by performing the switching control of the control valve device 16 by the controller 35 along processing programs shown in FIG. 5, FIG. 8, and FIG. 9, the telescopic speed of the hoist cylinder 10 can be variably adjusted corresponding to the weight of objects to be transported to appropriately alleviate the shock at stopping and improve the operability and the stability.

First, an adjustment operation of the expansion speed of the hoist cylinder 10 at raising control processing will be explained based upon FIG. 5.

Namely, in FIG. 5, when the raising control process is started, at step 1, a detection signal is read in from the lever sensor 29, and at next step 2, it is determined whether or not the raising operation of the vessel 3 is performed. When the determination of "NO" is made at step 2, since an operation other than the raising operation is performed, the process goes to step 12. In this case, for example, the floating control process shown in FIG. 8, the lowering control process shown in FIG. 9 or the like is performed as other processes. However, when the determination of "YES" is made at step 2, since the raising operation of the vessel 3 is performed, the vessel 3 is raised upward from the vehicle body 2 at step 3.

Therefore, at next step 4, a cylinder pressure P as a load pressure of the hoist cylinder 10 is read in from the pressure sensor 32. In addition, an oil temperature T as a temperature of the oil liquid is read in from the oil temperature sensor 33, and a tilting angle θ of the vessel 3 is read in from the angle sensor 31. At next step 5, the control map for flow amount adjustment shown in FIG. 6 is read out and a target opening area St1 corresponding to the cylinder pressure P and the oil temperature T is calculated from the control map.

Namely, the characteristic line 38 is selected among the characteristic lines 38 to 40 shown in FIG. 6 in a case where the oil temperature T is low, and the target opening area St1 corresponding to the cylinder pressure P is found from the characteristic line 38. The characteristic line 39 is selected in a case where the oil temperature T is high, and the target opening area St1 corresponding to the cylinder pressure P is found from the characteristic line 39. Further, the characteristic line 40 is selected in a case where the oil temperature T is an intermediate temperature, and the target opening area St1 corresponding to the cylinder pressure P is found from the characteristic line 40.

At next step 6, it is determined whether or not the tilting angle θ of the vessel 3 detected by the angle sensor 31 is increased to a predetermined determination angle θ1 or more. Here, the determination angle θ1 is an angle for determining whether or not the hoist cylinder 10 approaches a stop position in the expansion side, that is, is close thereto, and, for example, corresponds to a case where the tilting angle θ shown in FIG. 2 becomes the order of 45 to 53 degrees.

Since the tilting angle θ of the vessel 3 is smaller than the determination angle θ1 during a period where the determination of "NO" is made at step 6, the process goes back to step 3, and the processes after that continue to be executed. However, since the tilting angle θ of the vessel 3 reaches the determination angle θ1 when the determination of "YES" is made at step 6, the process goes to step 7, and the switching of the first and second direction control valves 20 and 21 is controlled to operate the first and second expansion side variable throttle portions 20C and 21C.

Namely, at step 7, the adjustment control of the flow amount by the first and second expansion side variable throttle portions 20C and 21C is performed such that an opening area of each of the first and second direction control valves 20 and 21 becomes an area in agreement with the target opening area St1 at step 5. Thereby, the flow amount of the pressurized oil flowing in the first and second direction control valves 20 and 21 toward the actuator side oil passages 22A and 23A from the high-pressure side oil passage 17 is adjusted through the first and second expansion side variable throttle portions 20C and 21C and the hoist cylinder 10 is controlled such that the expansion speed becomes an appropriate speed.

Next, at step 8, the tilting angle θ of the vessel 3 is again read in from the angle sensor 31 and at step 9 it is determined whether or not the tilting angle θ at this time is increased to a predetermined raising stop angle θ2 or more. Since the hoist cylinder 10 is in the expansion stroke during a period where the determination of "NO" is made at step 9, the process goes back to step 7, and the processes after that continue to be executed. The tilting angle θ of the vessel 3 reaches the raising stop angle θ2 (for example, θ=55 to 57 degrees) when the determination of "YES" is made at step 9.

Accordingly, in this case, the process goes to next step 10, and the adjustment control of the flow amount by the expansion side variable throttle portions 20C and 21C of the first and second direction control valves 20 and 21 is completed. At step 11, both of the first and second direction control valves 20 and 21 are returned back to the neutral position (N) to stop the expansion motion of the hoist cylinder 10, thus stopping the raising of the vessel 3.

In consequence, when the hoist cylinder 10 is expanded to raise the vessel 3, the expansion speed of the hoist cylinder 10 can be variably adjusted corresponding to a load pressure by a cylinder pressure P in the hoist cylinder 10 and an oil temperature T as a temperature of the pressurized oil therein, and therefore, when the hoist cylinder 10 is stopped in an original stop position, generation of the shock can be suppressed. As a result, the event that the expansion speed of the hoist cylinder 10 becomes excessively quick or slow can be prevented, thus improving the operability, stability, and workability at the raising operation of the vessel 3.

Next, an adjustment operation of the contraction speed of the hoist cylinder 10 at floating control processing will be explained based upon FIG. 8.

In FIG. 8, when the floating control processing operation is started, at step 21, a detection signal is read in from the lever sensor 29, and at next step 22, it is determined whether or not the floating operation of the vessel 3 is performed. When the determination of "NO" is made at step 22, since an operation other than the floating operation is performed, the process goes to step 34, and, for example, the raising control process shown in FIG. 5, the lowering control process shown in FIG. 9 or the like is performed. However, when the determination of "YES" is made at step 22, since the floating operation of the vessel 3 is performed, the vessel 3 lowers to the side of the vehicle body 2 from the raising position by step 23.

At next step 24, a cylinder pressure P during the contraction stroke of the hoist cylinder 10 is read in from the pressure sensor 32, an oil temperature T is read in from the oil temperature sensor 33, and a tilting angle θ of the vessel 3 is read in from the angle sensor 31. At next step 25, the control map for flow amount adjustment shown in FIG. 6 is read out and a target opening area St2 corresponding to the cylinder pressure P and the oil temperature T is calculated from the control map. It should be noted that since the process at step 25 is the same as that at step 5 shown in FIG. 5 described before, the explanation of the subsequent steps is omitted.

At next step 26, an tilting angle θ of the vessel 3 is differentiated to calculate a lowering speed V. At next step 27, a characteristic map by the characteristic line 41 shown in FIG. 7 is read out, and a control start angle θx of the flow amount adjustment corresponding to the lowering speed V of the vessel 3 is found by calculation from the characteristic line 41. Namely, in the characteristic line 41 shown in FIG. 7, when the lowering speed V of the vessel 3 is quick, the control start angle θx is selected as a larger angle for speeding up the control start timing of the flow amount adjustment. On the other hand, when the lowering speed V of the vessel 3 is slow, the control start angle θx is selected as a smaller angle for slowing down the control start timing of the flow amount adjustment.

At next step 28, it is determined whether or not the tilting angle θ of the vessel 3 detected by the angle sensor 31 is decreased to the control start angle θx by step 27 or less. Since the tilting angle θ of the vessel 3 is larger than the control start angle θx during a period where the determination of "NO" is made at step 28, the process goes back to step 23, and the processes after that continue to be executed.

Since the tilting angle θ of the vessel 3 is decreased to the control start angle θx when the determination of "YES" is made at step 28, the process goes to next step 29. At step 29, the switching of the first direction control valve 20 is controlled to start the adjustment control of the flow amount by the first contraction side variable throttle portion 20D. At this time, the first direction control valve 20 performs the adjustment control of the flow amount by the first contraction side variable throttle portion 20D such that an opening area corresponding to a flow passage area of the first contraction side variable throttle portion 20D is an area in agreement with the target opening area St2 by step 25.

Accordingly, the oil liquid discharged from the oil chamber A in each of the hoist cylinders 10 through the hydraulic conduits 15A, the actuator side oil passage 22A, and the first direction control valve 20 toward the tank 12 is variably adjusted in the flow amount through the first contraction side variable throttle portion 20D. Namely, the hoist cylinder 10 is controlled such that the contraction speed becomes an appropriate speed corresponding to the weight, the oil temperature T, and the lowering speed V in the side of the vessel 3.

Next, at step 30, the tilting angle θ of the vessel 3 is again read in from the angle sensor 31 and, at step 31, it is determined whether or not the tilting angle θ at this time is decreased to a predetermined lowering stop angle θ0 or less. Since the hoist cylinder 10 is in the contraction stroke during a period where the determination of "NO" is made at step 31, the process goes back to step 29, and the processes after that continue to be executed. The tilting angle θ of the vessel 3 reaches the lowering stop angle θ0 (for example, θ0=0 to 2 degrees) when the determination of "YES" is made at step 31.

Therefore, in this case, the process goes to next step 32, and the adjustment control of the flow amount by the contraction side variable throttle portion 20D of the first direction control valve 20 is completed. Further, at step 33 the first and second direction control valves 20 and 21 both are returned back to the neutral position (N) to stop the contraction motion of the hoist cylinder 10, thus stopping the lowering of the vessel 3.

As a result, when the hoist cylinder 10 is contracted by the load in the side of the vessel 3 to allow the lowering of the vessel 3, the contraction speed of the hoist cylinder 10 can be variably adjusted corresponding to a load pressure, an oil temperature T, and a lowering speed V of the hoist cylinder 10, and when the hoist cylinder 10 is stopped in an original stop position, generation of the shock can be suppressed. Further, since the event that the contraction speed of the hoist cylinder 10 becomes excessively quick or slow can be prevented, the operability, stability, and workability at the floating operation of the vessel 3 can be improved.

Next, an adjustment operation of the contraction speed of the hoist cylinder 10 at lowering control processing will be explained based upon FIG. 9.

In FIG. 9, when the lowering control processing operation is started, at step 41, a detection signal is read in from the lever sensor 29, and, at next step 42, it is determined whether or not the lowering operation of the vessel 3 is performed. When the determination of "NO" is made at step 42, since an operation other than the lowering operation is performed, the process goes to step 54, and, for example, the raising control process shown in FIG. 5, the floating control process shown in FIG. 8 and the like is performed.

When the determination of "YES" is made at step 42, since the lowering operation of the vessel 3 is performed, the vessel 3 lowers to the side of the vehicle body 2 from the raising position by step 43. In this case, the processes of next step 44 to step 48 are executed in the same way with the processes of step 24 to step 28 shown in FIG. 8. At step 48, it is determined whether or not the tilting angle θ of the vessel 3 detected by the angle sensor 31 is decreased to the control start angle θx by step 47 or less.

In this case, since the lowering operation of the vessel 3 is performed, for example, the contraction speed of the hoist cylinder 10 and the lowering speed V of the vessel 3 are quicker than in a case of the floating operation. Therefore, in the process by step 47, the control start angle θx is selected as a larger angle than in a case of the floating operation and the control start timing is also set as a quicker timing in the lowering operation.

The tilting angle θ of the vessel 3 is decreased to the control start angle θx or less when the determination of "YES" is made at step 48. Therefore, at step 49, the switching of the second direction control valve 21 is controlled to start the adjustment control of the flow amount by the second contraction side variable throttle portion 21D. At this time, the second direction control valve 21 performs the adjustment control of the flow amount by the second contraction side variable throttle portion 21D such that an opening area corresponding to a flow passage area of the second contraction side variable throttle portion 21D is an area in agreement with the target opening area St3 by step 45.

Therefore, the oil liquid discharged from the oil chamber A in each of the hoist cylinders 10 through the hydraulic conduits 15A, the actuator side oil passage 23A, and the second direction control valve 21 toward the tank 12 is variably adjusted in the flow amount by the second contraction side variable throttle portions 21D, and the hoist cylinder 10 is controlled such that the contraction speed becomes an appropriate speed corresponding to the weight, the oil temperature T, and the lowering speed V in the side of the vessel 3.

Next, at step 50, the tilting angle θ of the vessel 3 is again read in from the angle sensor 31 and at step 51 it is determined whether or not the tilting angle θ at this time is decreased to a lowering angle θ0 or less. Since the hoist cylinder 10 is in the contraction stroke during a period where the determination of "NO" is made at step 51, the process goes is back to step 49, wherein the processes after that continue to be executed. When the determination of "YES" is made at step 51, the process goes to step 52, and the adjustment control of the flow amount by the contraction side variable throttle portion 21D of the second direction control valve 21 is completed. At step 53, the first and second direction control valves 20 and 21 both are returned to the neutral position (N) to stop the contraction motion of the hoist cylinder 10, thus stopping the lowering of the vessel 3.

In consequence, when the hoist cylinder 10 is contracted by the pressurized oil to allow the lowering of the vessel 3, the contraction speed of the hoist cylinder 10 can be variably adjusted corresponding to a load pressure, an oil temperature T, and a lowering speed V of the hoist cylinder 10, and when the hoist cylinder 10 is stopped in an original stop position, generation of the shock can be suppressed. Further, since the event that the contraction speed of the hoist cylinder 10 becomes excessively quick or slow can be prevented, the operability, stability, and workability at the lowering operation of the vessel 3 can be improved.

In this way, according to the present embodiment, the controller 35 expands the hoist cylinder 10 to raise the vessel 3 or contracts the hoist cylinder 10 to lower the vessel 3 by the processes shown in FIG. 5, FIG. 8, and FIG. 9. When the controller 35 determines that the hoist cylinder 10 approaches the stop position during this period, the controller 35 variably adjusts the flow amount of the oil liquid flowing in the control valve device 16 such that the telescopic speed of the hoist cylinder 10 is quick or slow corresponding to the weight in the side of the vessel 3. As a result, when the hoist cylinder 10 gets close to the stop position, the controller 35 can throttle a flow passage area or an opening area of each of the first and second direction control valves 20 and 21 in the vicinity of the stop position.

Therefore, in a case where the object weight in the side of the vessel 3 is heavy or light, even if the telescopic speed of the hoist cylinder 10 is quick, the flow amount of the oil liquid can be appropriately throttled through the control valve device 16, and the motion of the hoist cylinder 10 can be suppressed before reaching the stop position to alleviate generation of a shock.

Particularly also in a case of lowering the vessel 3 to a position of being seated on the side of the vehicle body 2 in a state where objects to be transported are loaded on the vessel 3, the controller 35 controls the switching of the control valve device 16 in such a manner as to slow down the contraction speed of the hoist cylinder 10, and the flow amount of the oil liquid flowing in the first direction control valve 20 or the second direction control valve 21 can be throttled by the contraction side variable throttle portion 20D or 21D in the control valve device 16.

In consequence, it is possible to suppress for the vessel 3 loaded with objects to be seated on the side of the vehicle body 2 in a quick speed and to reduce the shock at the time the vessel 3 is seated on the side of the vehicle body 2. Accordingly, an operator of the dump truck 1 can easily perform an operation of lowering the vessel 3 in a loaded state of objects to be transported without paying a particular attention to improve operability and stability of the operating lever 28A.

On the other hand, in a case where the object weight in the side of the vessel 3 is light or the vessel 3 is vacant, the flow amount of the oil liquid is appropriately adjusted through the control valve device 16, and therefore, it can be prevented that the expansion speed of the hoist cylinder 10 is excessively quick or the contraction speed thereof is excessively slow, thus stopping the hoist cylinder 10 in an original stop position in a state of suppressing the shock. Accordingly, an operator of the dump truck 1 can raise or lower the vessel 3 in a short time simply by operating the operating lever 28A as usual without being subjected to an influence of a size of objects to be transported or presence/absence of object loading, and generation of the shock at the time of stopping the hoist cylinder 10 can be suppressed to improve operability and stability.

In addition, the controller 35 can correct the adjustment flow amount of the oil liquid corresponding to the temperature of the oil liquid detected by the oil temperature sensor 33. Therefore, the flow amount of the oil liquid flowing between the hoist cylinder 10 and the hydraulic source can be appropriately adjusted in the form of correcting an influence of the viscosity resistance accompanying the temperature change of the oil liquid, and the shock at the time of stopping the hoist cylinder 10 can be properly alleviated regardless of the change in the oil temperature T.

Further, an angle of the determination reference is changed according to a lowering speed V or a tilting speed of the vessel 3, and thereby, when the tilting speed is quick, the adjustment control of the flow amount through the control valve device 16 can be started at the earlier timing based upon whether or not the tilting angle θ of the vessel 3 reaches the angle of the corresponding determination reference. On the other hand, when the tilting speed is slow, the angle of the determination reference can be set to be slow, and the adjustment control of the flow amount through the control valve device 16 can be started at the delayed timing based upon whether or not the tilting angle θ of the vessel 3 reaches the angle of the determination reference (control start angle θx).

It should be noted that according to the aforementioned embodiment, in the raising control process shown in FIG. 5, the process of step 6 shows a special example of stop position approach determining means as the constitution element of the present invention, and the process of step 7 shows a special example of flow amount adjusting means. In the floating control process shown in FIG. 8, the process of step 28 shows a special example of stop position approach determining means, and the process of step 29 shows a special example of flow amount adjusting means. Further, in the lowering control process shown in FIG. 9, the process of step 48 shows a special example of stop position approach determining means, and the process of step 49 shows a special example of flow amount adjusting means.

In the aforementioned embodiment, an explanation is made by taking a case where the tilting state detector is constituted by the angle sensor 31 as an example. However, the present invention is not limited to the same, and, for example, the detector for detecting a tilting state of the vessel 3 may be constituted by using both of the sit-down sensor 30 and the angle sensor 31. On the other hand, the detector may be constituted only by using the sit-down sensor 30 to detect whether or not the vessel 3 is seated on the vehicle body 2, that is, the vessel 3 is in a tilting state.

On the other hand, in the aforementioned embodiment, an explanation is made by taking a case where the weight detector is constituted by the pressure sensor 32 used for detecting a load pressure of the hoist cylinder 10 as an example. However, the present invention is not limited to the same, and, for example, the weight detector may comprise the pressure sensor 34F provided in the front suspension 7A in the side of the front wheel 7 and the pressure sensor 34R provided in the rear suspension 8A in the side of the rear wheel 8. Namely, a weight in the side of the vessel 3 can be measured as a vehicle weight from inner pressures of the front suspension 7A and the rear suspension 8A detected by the pressure sensors 34F and 34R.

In the aforementioned embodiment, an explanation is made by taking a case of constituting the control valve device 16 using the two direction control valves 20 and 21 as an example. However, the present invention is limited to the same, and, for example, the control valve device may be constituted by using one direction control valve to be switched to four positions (for example, neutral position, raising position, floating position, and lowering position).

Further, in the aforementioned embodiment, an explanation is made by taking a case of using the rear wheel drive type dump truck 1 as the transporter vehicle, as an example. However, the present invention is not limited to the same, and, for example, the transporter vehicle may be applied to, a front wheel drive type dump truck or a four-wheel drive type dump truck driving front and rear wheels both. Further, the transporter vehicle may be applied to a transporter vehicle equipped with wheels for travelling other than the dump truck.

DESCRIPTION OF REFERENCE NUMERALS

1: Dump truck (Transporter vehicle)
2: Vehicle body
3: Vessel (Loading platform)
4: Crushed stones (Objects to be transported)
5: Connecting pin
6: Cab
7: Front wheel
7A: Front suspension
8: Rear wheel
8A: Rear suspension
9: Engine
10: Hoist cylinder
11: Hydraulic pump (Hydraulic source)
12: Operating oil tank (Hydraulic source)
16: Control valve device
20, 21: Direction control valve
20C, 21C: Expansion side variable throttle portion
20D, 21D: Contraction side variable throttle portion
28: Operating lever device (Operating device)
28A: Operating lever
29: Lever sensor (Operation detecting means)
30: Sit-down sensor
31: Angle sensor (Tilting state detector)
32: Pressure sensor (Weight detector)
33: Oil temperature sensor
34F, 34R: Pressure sensor
35: Controller
36: Pilot pressure generator

The invention claimed is:

1. A transporter vehicle comprising:
an automotive vehicle body;
a loading platform tiltably disposed on said vehicle body to load one or more objects to be transported thereon;
a hoist cylinder telescopically disposed between said loading platform and said vehicle body and expanding at the time of dumping the objects from said loading platform to obliquely tilt said loading platform;
a hydraulic source for generating pressurized liquid to be supplied to said hoist cylinder;
a control valve device disposed between said hydraulic source and said hoist cylinder for controlling the supply and the discharge of the pressurized liquid to and from said hoist cylinder; and
an operating device to switch said control valve device;
a tilting state detector to detect a tilting state of said loading platform to said vehicle body;
a weight detector to detect a weight of said objects loaded on said loading platform; and
a controller for controlling switching of said control valve device based upon signals from said operating device, said tilting state detector and said weight detector;
wherein said controller is configured to:
determine whether or not said hoist cylinder approaches a stop position on a contraction side thereof based upon signals from said operating device and said tilting state detector; and
when it is determined that said hoist cylinder approaches the stop position on the contraction side, control the switching of said control valve device to change a contracting speed of said hoist cylinder corresponding to the weight on said loading platform detected by said weight detector by variably adjusting a flow amount of liquid flowing between said hoist cylinder and said hydraulic source through said control valve device,
wherein said controller variably sets a determination reference value, at the time of determining whether or not said hoist cylinder approaches the stop position on the contraction side, corresponding to a tilting speed of said loading platform, and corrects a start timing of the flow amount adjustment according to the determination reference value.

2. A transporter vehicle according to claim 1, further comprising:
a temperature sensor to detect a temperature of the liquid flowing in said control valve device,
wherein said controller is further configured to:
correct the adjustment flow amount of the liquid corresponding to the temperature of the liquid detected by said temperature sensor.

3. A transporter vehicle according to claim 1, wherein said weight detector is a pressure sensor detecting a load pressure in said hoist cylinder.

4. A transporter vehicle according to claim 1, wherein said tilting state detector is an angle sensor detecting a tilting angle of said loading platform to said vehicle body.

5. A transporter vehicle according to claim 4, wherein said controller is further configured to:
determine whether or not said hoist cylinder approaches the stop position on the contraction side based upon whether or not the tilting angle of said loading platform detected by said angle sensor reaches said determination reference value, and said controller variably sets said determination reference value as an angular value corresponding to a tilting speed of said loading platform.

6. A transporter vehicle according to claim 1, wherein said control valve device includes:
a plurality of switching positions including a neutral position stopping the supply and the discharge of the pressurized liquid to stop said hoist cylinder; a raising position expanding said hoist cylinder by the supply and the discharge of the pressurized liquid to raise said loading platform; a floating position contracting said hoist cylinder by self-weight of said loading platform to allow a self-weighted fall of said loading platform; and a lowering position contracting said hoist cylinder by the supply and the discharge of the pressurized liquid to lower said loading platform, wherein said control valve device has an expansion side variable throttle portion for performing a flow amount adjustment of the liquid according to a control signal of said controller to variably adjust an expansion speed of said hoist cylinder corresponding to said raising position, and wherein said control valve device has a contraction side variable throttle portion for performing a flow amount adjustment of the liquid according to a control signal of said controller to variably adjust the contracting speed of said hoist cylinder corresponding to each of said floating position and said lowering position.

7. A transporter vehicle according to claim 1, wherein said control valve device includes:

a first direction control valve switchable to any one of a neutral position stopping the supply and the discharge of the pressurized liquid to stop said hoist cylinder, a raising position expanding said hoist cylinder by the supply and the discharge of the pressurized liquid to raise said loading platform, and a floating position contracting said hoist cylinder by self-weight of said loading platform to allow a self-weighted fall of said loading platform, according to a control signal from said controller; and a second direction control valve switchable to any one of said neutral position, said raising position, and a lowering position contracting said hoist cylinder by the supply and the discharge of the pressurized liquid to lower said loading platform, according to said control signal from said controller, wherein said first direction control valve includes a first expansion side variable throttle portion for variably adjusting a flow amount of the liquid according to said control signal of said controller when said first direction control valve is switched to said raising position and a first contraction side variable throttle portion for variably adjusting a flow amount of the liquid according to said control signal of said controller when said first direction control valve is switched to said floating position; and said second direction control valve includes a second expansion side variable throttle portion for variably adjusting a flow amount of the liquid according to said control signal of said controller when said second direction control valve is switched to said raising position and a second contraction side variable throttle portion for variably adjusting a flow amount of the liquid according to said control signal of said controller when said second direction control valve is switched to said lowering position.

* * * * *